United States Patent
Delbridge

(10) Patent No.: US 12,536,561 B2
(45) Date of Patent: *Jan. 27, 2026

(54) DETERMINING WINNING ARMS OF A/B ELECTRONIC COMMUNICATION TESTING USING RESAMPLING-BASED BAYESIAN NONPARAMETRICS

(71) Applicant: Klaviyo, Inc., Boston, MA (US)

(72) Inventor: Ian Delbridge, Boston, MA (US)

(73) Assignee: Klaviyo, Inc., Boston, MA (US)

( * ) Notice: Subject to any disclaimer, the term of this patent is extended or adjusted under 35 U.S.C. 154(b) by 130 days.

This patent is subject to a terminal disclaimer.

(21) Appl. No.: 18/588,109

(22) Filed: Feb. 27, 2024

(65) Prior Publication Data

US 2024/0394746 A1     Nov. 28, 2024

Related U.S. Application Data

(63) Continuation-in-part of application No. 18/539,444, filed on Dec. 14, 2023, now Pat. No. 12,387,236.
(Continued)

(51) Int. Cl.
G06Q 30/0242     (2023.01)
G06N 5/04         (2023.01)

(52) U.S. Cl.
CPC ........... *G06Q 30/0243* (2013.01); *G06N 5/04* (2013.01)

(58) Field of Classification Search
CPC .............................. G06Q 30/0243; G06N 5/04
(Continued)

(56) References Cited

U.S. PATENT DOCUMENTS 7,130,808 B1  10/2006  Ranka et al.
7,213,202 B1   5/2007  Kagle
(Continued)

FOREIGN PATENT DOCUMENTS

EP        4174577 A1    5/2023
WO    2010138512 A1   12/2010

OTHER PUBLICATIONS

VWO, A/B Testing Guide, 2023 (Year: 2023).*
(Continued)

*Primary Examiner* — Tarek Elchanti
(74) *Attorney, Agent, or Firm* — Brian R. Short

(57) ABSTRACT

Apparatuses, methods, and systems for determining winning arms of electronic testing. One method includes obtaining historical data values related to the A/B test of a user, storing the historical data values, determining a historical weight for the historical data values, receiving new data values from the plurality of computing devices collected based on recipient actions during execution of the A/B, constructing a Dirichlet distribution, inferring corresponding central tendencies of samplings of a metric distribution, wherein each central tendency of the corresponding central tendencies is determined by sampling the Dirichlet distribution, constructing an overall utility distribution for each arms of the A/B test by combining the central tendency of each sampling of the metric distribution with a corresponding sampling of a conversion probability distribution, determining a winning arm of the A/B testing by comparing the overall utility distribution of each arm with each other arm of the A/B test.

18 Claims, 12 Drawing Sheets

Related U.S. Application Data which is a continuation of application No. 18/201,644, filed on May 24, 2023, now Pat. No. 11,887,149.

(58) Field of Classification Search
USPC ...................................................... 705/14.42
See application file for complete search history.

(56) References Cited

U.S. PATENT DOCUMENTS

| | | | |
|---|---|---|---|
| 7,257,772 | B1 | 8/2007 | Jones et al. |
| 7,287,218 | B1 | 10/2007 | Knotz et al. |
| 7,533,090 | B2 | 5/2009 | Agarwal et al. |
| 7,752,607 | B2 | 7/2010 | Larab et al. |
| 7,761,524 | B2 | 7/2010 | Carmel et al. |
| 7,845,950 | B2 | 12/2010 | Driscoll et al. |
| 7,975,000 | B2 | 7/2011 | Dixon et al. |
| 7,975,223 | B2 | 7/2011 | Plumley et al. |
| 8,117,267 | B2 | 2/2012 | Gardner et al. |
| 8,224,905 | B2 | 7/2012 | Bocharov et al. |
| 8,250,470 | B2 | 8/2012 | Takashima |
| 8,341,224 | B2 | 12/2012 | Kasetty et al. |
| 8,434,002 | B1 | 4/2013 | Shah et al. |
| 8,484,156 | B2 | 7/2013 | Hancsarik et al. |
| 9,237,233 | B2 | 1/2016 | Soundar |
| 9,319,297 | B2 | 4/2016 | Aurisset |
| 9,356,889 | B2 | 5/2016 | Caskey et al. |
| 9,430,454 | B2 | 8/2016 | Newman et al. |
| 9,485,640 | B2 | 11/2016 | Bowers et al. |
| 10,248,657 | B2 | 4/2019 | Prahlad et al. |
| 10,313,387 | B1 | 6/2019 | Kras |
| 10,331,775 | B2 | 6/2019 | Ryan et al. |
| 10,438,230 | B2 | 10/2019 | Moran et al. |
| 10,503,912 | B1 | 12/2019 | Kerr |
| 10,701,005 | B2 | 6/2020 | Nutt et al. |
| 10,817,663 | B2 | 10/2020 | Weald et al. |
| 11,475,207 | B2 | 10/2022 | Xie et al. |
| 11,483,272 | B2 | 10/2022 | Klink et al. |
| 11,488,204 | B2 | 11/2022 | Pisupati et al. |
| 11,734,724 | B1 | 8/2023 | Kingman, Jr. et al. |
| 11,769,171 | B1 | 9/2023 | Huang |
| 11,783,122 | B1 | 10/2023 | Lawson et al. |
| 11,783,643 | B1 | 10/2023 | Khiabani et al. |
| 11,847,106 | B2 | 12/2023 | Urdiales et al. |
| 11,880,650 | B1 | 1/2024 | Li et al. |
| 2002/0004745 | A1 | 1/2002 | Bascobert et al. |
| 2004/0006598 | A1 | 1/2004 | Bargagli Damm et al. |
| 2005/0273705 | A1 | 12/2005 | McCain |
| 2006/0162071 | A1 | 7/2006 | Dixon et al. |
| 2006/0168024 | A1 | 7/2006 | Mehr et al. |
| 2006/0225040 | A1 | 10/2006 | Waddington |
| 2007/0100805 | A1 | 5/2007 | Ramer et al. |
| 2007/0271392 | A1 | 11/2007 | Khopkar et al. |
| 2008/0144813 | A1 | 6/2008 | Furukawa |
| 2008/0178073 | A1 | 7/2008 | Gao et al. |
| 2008/0189156 | A1 | 8/2008 | Voda et al. |
| 2008/0215692 | A1 | 9/2008 | Bosarge et al. |
| 2008/0275980 | A1 | 11/2008 | Hansen |
| 2009/0006936 | A1 | 1/2009 | Parker et al. |
| 2009/0018996 | A1 | 1/2009 | Hunt et al. |
| 2009/0037546 | A1 | 2/2009 | Kirsch |
| 2009/0089131 | A1 | 4/2009 | Moukas et al. |
| 2009/0125518 | A1 | 5/2009 | Bailor et al. |
| 2009/0132459 | A1 | 5/2009 | Hicks |
| 2009/0222296 | A1 | 9/2009 | Wagner et al. |
| 2010/0049534 | A1 | 2/2010 | Whitnah et al. |
| 2010/0268661 | A1 | 10/2010 | Levy et al. |
| 2010/0281074 | A1 | 11/2010 | Bailor et al. |
| 2011/0078246 | A1 | 3/2011 | Dittmer-Roche |
| 2011/0270710 | A1 | 11/2011 | Nash |
| 2011/0307331 | A1 | 12/2011 | Richard et al. |
| 2012/0042239 | A1 | 2/2012 | O'Brien |
| 2012/0191546 | A1 | 7/2012 | Phelan et al. |
| 2012/0233554 | A1 | 9/2012 | Vagell et al. |
| 2012/0294514 | A1 | 11/2012 | Saunders et al. |
| 2013/0066665 | A1 | 3/2013 | Tamhane et al. |
| 2013/0080243 | A1 | 3/2013 | Dias |
| 2013/0124956 | A1 | 5/2013 | Hatfield et al. |
| 2013/0185311 | A1 | 7/2013 | MacMillan et al. |
| 2014/0019443 | A1 | 1/2014 | Golshan |
| 2014/0025608 | A1 | 1/2014 | Miller et al. |
| 2014/0033101 | A1 | 1/2014 | Rein et al. |
| 2014/0100964 | A1 | 4/2014 | Kramer et al. |
| 2014/0189714 | A1 | 7/2014 | Lawbaugh et al. |
| 2014/0278747 | A1 | 9/2014 | Gumm et al. |
| 2014/0282125 | A1 | 9/2014 | Duneau |
| 2014/0344013 | A1 | 11/2014 | Karty et al. |
| 2014/0378071 | A1 | 12/2014 | Acosta |
| 2015/0019662 | A1 | 1/2015 | O'Kane et al. |
| 2015/0058428 | A1 | 2/2015 | Caskey et al. |
| 2015/0170213 | A1 | 6/2015 | O'Malley |
| 2015/0220577 | A1 | 8/2015 | Sengupta et al. |
| 2015/0227962 | A1 | 8/2015 | Wical et al. |
| 2015/0294349 | A1 | 10/2015 | Capel et al. |
| 2015/0347925 | A1 | 12/2015 | Zeng et al. |
| 2016/0070717 | A1 | 3/2016 | Bergner et al. |
| 2016/0117717 | A1* | 4/2016 | Moreau .............. G06Q 30/0245 |
| | | | 705/14.42 |
| 2016/0132472 | A1 | 5/2016 | Campbell et al. |
| 2016/0162929 | A1 | 6/2016 | takiela et al. |
| 2016/0189176 | A1 | 6/2016 | Newnham et al. |
| 2017/0019697 | A1 | 1/2017 | Hundemer |
| 2017/0178193 | A1 | 6/2017 | Jagannath et al. |
| 2017/0221109 | A1 | 8/2017 | Liu et al. |
| 2018/0053199 | A1 | 2/2018 | Mathis et al. |
| 2018/0081868 | A1 | 3/2018 | Willcock et al. |
| 2018/0082326 | A1 | 3/2018 | Massis et al. |
| 2018/0108029 | A1 | 4/2018 | Sinha et al. |
| 2018/0225027 | A1 | 8/2018 | Cooke et al. |
| 2018/0293502 | A1 | 10/2018 | Sengupta et al. |
| 2018/0341873 | A1 | 11/2018 | Fellows |
| 2019/0121827 | A1 | 4/2019 | Boswell et al. |
| 2019/0122254 | A1* | 4/2019 | Duquette ........... G06Q 30/0243 |
| 2019/0130333 | A1 | 5/2019 | Li et al. |
| 2019/0197092 | A1 | 6/2019 | Thiesen et al. |
| 2019/0228063 | A1 | 7/2019 | El-Sherif et al. |
| 2019/0259041 | A1 | 8/2019 | Jackson |
| 2019/0311301 | A1 | 10/2019 | Pyati |
| 2020/0104340 | A1 | 4/2020 | Liu et al. |
| 2020/0226640 | A1 | 7/2020 | Kakarlapudi et al. |
| 2020/0319996 | A1 | 10/2020 | Mordo et al. |
| 2020/0327577 | A1 | 10/2020 | Truong et al. |
| 2020/0342500 | A1 | 10/2020 | Kulkarni et al. |
| 2020/0356624 | A1 | 11/2020 | Cai et al. |
| 2020/0357012 | A1 | 11/2020 | Kendall et al. |
| 2020/0394455 | A1 | 12/2020 | Lee et al. |
| 2021/0004422 | A1 | 1/2021 | Sun et al. |
| 2021/0042830 | A1 | 2/2021 | Burke |
| 2021/0109897 | A1 | 4/2021 | Brechbuhl et al. |
| 2021/0133287 | A1 | 5/2021 | Ayloo |
| 2021/0133852 | A1 | 5/2021 | Vauthey et al. |
| 2021/0157974 | A1 | 5/2021 | Xie et al. |
| 2021/0184999 | A1 | 6/2021 | Klink et al. |
| 2021/0294978 | A1 | 9/2021 | Chhaya et al. |
| 2021/0357952 | A1 | 11/2021 | Liu et al. |
| 2021/0389962 | A1 | 12/2021 | Li |
| 2022/0036311 | A1 | 2/2022 | Didrickson et al. |
| 2022/0113853 | A1 | 4/2022 | Nostrini et al. |
| 2022/0188740 | A1 | 6/2022 | Nazarali et al. |
| 2022/0283932 | A1* | 9/2022 | Arbour ................. G06F 16/958 |
| 2022/0405783 | A1 | 12/2022 | Kondamudi et al. |
| 2022/0405784 | A1 | 12/2022 | Kondamudi et al. |
| 2022/0414325 | A1 | 12/2022 | Bhatnagar et al. |
| 2022/0414686 | A1* | 12/2022 | Lawson .............. G06Q 30/0201 |
| 2022/0414696 | A1 | 12/2022 | Kondamudi et al. |
| 2022/0414705 | A1 | 12/2022 | Jain et al. |
| 2023/0033753 | A1 | 2/2023 | Wang et al. |
| 2023/0186342 | A1 | 6/2023 | Ding et al. |
| 2023/0298368 | A1 | 9/2023 | Berger et al. |
| 2023/0316186 | A1 | 10/2023 | Miller et al. |
| 2023/0409821 | A1 | 12/2023 | Lawson et al. |
| 2023/0413020 | A1 | 12/2023 | Lawson et al. |
| 2024/0005365 | A1 | 1/2024 | Chen et al. |
| 2024/0054539 | A1 | 2/2024 | Ekfeldt et al. |
| 2024/0250922 | A1 | 7/2024 | Natoli et al. |

(56) References Cited

U.S. PATENT DOCUMENTS

| | | | |
|---|---|---|---|
| 2024/0281822 A1 | 8/2024 | Austin et al. | |
| 2024/0338413 A1* | 10/2024 | Fosse | G06F 16/93 |
| 2024/0394746 A1 | 11/2024 | Delbridge | |
| 2025/0238839 A1 | 7/2025 | Blanchard et al. | |

OTHER PUBLICATIONS

Cali, Sedef, et al. "A Bayesian based Approach for Analyzing Customer's Online Sales Data to Identify Weights of Product Attributes." Expert Systems with Applications, vol. 210, Aug. 9, 2022. (Year: 2022).

Frigui, Hichem, et al. "Unsupervised Clustering and Feature Weighting based on Generalized Dirichlet Mixture Modeling." Sience Direct: Information Sciences 274, pp. 35-54. Mar. 27, 2014. (Year: 2014).

Kamalbasha, Shafi, et al. "Bayesian A/B Testing for Business Decisions." Data Science: Analytics and Applications, p. 50-57. Mar. 5, 2020. (Year: 2020).

Kobayashi, Takumi. "Dirichlet-Based Histogram Feature Transform for Image Classification." National Institute of Advanced Industrial Science and Technology, CVPR 2014. (Year: 2014).

Miller, Alex, et al. "An Empirical Meta-analysis of E-Commerce A/B Testing Strategies." The Wharton School, University of Pennsylvania, 2020. (Year: 2020).

Lachello, G. et al. (2005). Control, Deception, and Communication: Evaluating the Deployment of a Location-Enhanced Messaging Service. In: Beigl, M., Intille, S., Rekimoto, J., Tokuda, H. (eds) UbiComp 2005: Ubiquitous Computing. UbiComp 2005. Lecture Notes in Computer Science, vol. 3660. (Year: 2005).

ILC-CMAS Model, summary of research findings and implication for Content Creation and Management Automation System (CMAS), Choo Wou Onn; Halimah Badioze Zaman; Chue Wen Yeen, 2008 International Symposium on Information Technology, Year: 2008 I Conference Paper I Publisher: IEEE. (Year: 2008).

U.S. Appl. No. 65/195,571, Feb. 11, 2003, Guheen; Michael F. et al.

The Bayesian Bootstrap, Donald B. Rubin, The Annals of Statistics, 1981, vol. 9, No. 1, 130-134.

The Bayesian Bootstrap, A short guide to a simple and powerful extension of the bootstrap, Matteo Courthoud, published in the Towards Data Science, Aug. 8, 2022.

A nonparametric Bayesian analysis of heterogeneous treatment effects in digital experimentation, Matt Taddy, Matt Gardner, Liyun Chen, David Draper, University of California, Santa Cruz, Dec. 18, 2015.

U.S. Appl. No. 18/383,945, Oct. 23, 2023, Klaviyo-1032, Entire Document.

11 Best Drag and Drop Word Press Page Builder Plugins, by Anna Fitzgerald, Nov. 13, 2020, pp. 1-21; https://blog.hubspot.com/website/top-5-free-drag-and-drop-wordpress-page-builder-plugins (Year: 2020).

Lindholm (A 3-way Merging Algorithm for Synchronizing Ordered Trees—the 3DM merging and differencing tool for XML, published Sep. 2001, pp. 1-205) (Year: 2001).

Lindholm (A Three-way Merge for XML Documents, published Oct. 2004, pp. 1-10) (Year: 2004).

Lindholm (XML Three-way Merge as a Reconciliation Engine for Mobile Data, published Sep. 2003, pp. 1-5) (Year: 2003).

Paulo et al., Leveraging email marketing: Using the subject line to anticipate the open rate, Expert Systems with Applications, vol. 207, 2022, 117974.

WordPress Editor: Working With Blocks »Blocks, Jan. 1, 2021, pp. 1-6; https://wordpress.com/supporUwordpress-editor/blocks/ (Year: 2021).

Y. Yamamoto et al., "IoT-aware online shopping system enhanced with gaze analysis," 2016 World Automation Congress (WAC), Rio Grande, PR, USA, 2016, pp. 1-6, doi: 10.1109/WAC.2016.7583028.

U.S. Appl. No. 18/957,272, Nov. 22, 2024, Klaviyo-1046, Entire Document.

U.S. Appl. No. 19/041,685, Jan. 30, 2025, Klaviyo-1049, Entire Document.

Hao, Yaru, et al. "Language models are general-purpose interfaces." arXiv preprint arXiv:2206.06336 (2022). (Year: 2022).

Zhang, Rui, and Joel Tetreault. "This email could save your life: Introducing the task of email subject line generation." arXiv preprint arXiv: 1906.03497 (2019). (Year: 2019).

* cited by examiner

DETERMINING WINNING ARMS OF A/B ELECTRONIC COMMUNICATION TESTING USING RESAMPLING-BASED BAYESIAN NONPARAMETRICS

RELATED PATENT APPLICATIONS

This patent application is a continuation-in-part (CIP) of U.S. patent application Ser. No. 18/539,444, filed Dec. 14, 2023, which is a continuation of U.S. patent application Ser. No. 18/201,644, filed May 24, 2023, and granted as U.S. Pat. No. 11,887,149, on Jan. 30, 2024, which are all herein incorporated by reference.

FIELD OF THE DESCRIBED EMBODIMENTS

The described embodiments relate generally to intelligent electronic communication management. More particularly, the described embodiments relate to systems, methods, and apparatuses for determining winning arms of electronic testing using resampling-based Bayesian nonparametrics.

BACKGROUND

Typically, A/B testing systems of messages limit the number of metrics that can be used to determine which variation of the A/B test wins. The variations are limited to a subset of metrics that have been characterized manually, or users of the system are solicited for information, such as, an expected conversion rate, minimum detectable sample size, and/or desired power. When limiting the variation to a subset, the users may not be able to optimize messages for the metrics that matter the most. When soliciting information from the users, the users carry a large cognitive load and must answer questions they may not be able to answer. Moreover, non-binary metrics like revenue—in contrast with binary metrics like conversion rates—are especially difficult to model probabilistically, even when only modeling a single metric, much less specifying a model flexible enough to handle any metric.

It is desirable to have methods, apparatuses, and systems determining winning arms of electronic testing using resampling-based Bayesian nonparametrics.

SUMMARY

An embodiment includes a computer-implemented method for selecting a winner of an A/B test. The method includes obtaining historical data values related to the A/B test of a user of the user server, storing the historical data values, determining a historical weight for the historical data values, receiving new data values from the plurality of computing devices collected based on recipient actions during execution of the A/B test and an associated metric, constructing a Dirichlet distribution having one dimension for each of the historical data values and each of the received new data values, wherein distribution parameters of the Dirichlet distribution corresponding to the historical data values are the historical weight, and distribution parameters of the Dirichlet distribution corresponding to the received new data values are a new weight, wherein the new weight is at least as large as the historical weight, inferring corresponding central tendencies of samplings of a metric distribution, wherein each central tendency of the corresponding central tendencies is determined by sampling the Dirichlet distribution, constructing an overall utility distribution for each arms of the A/B test by combining the central tendency of each sampling of the metric distribution with a corresponding sampling of a conversion probability distribution, determining a winning arm of the A/B testing by comparing the overall utility distribution of each arm with each other arm of the A/B test; and electronically communicating with recipients of the computing devices using a template based on the winning arm of the A/B testing.

Another embodiment includes a system configured to select a winner of an A/B test. The system includes a plurality of computing devices, a user server, and aa management server, wherein the management server connected to the user server and the plurality of computing devices through a network. The server is configured to obtain historical data values related to the A/B test of a user of the user server; store the historical data values, determine a historical weight for the historical data values, receive new data values from the plurality of computing devices collected based on recipient actions during execution of the A/B test and an associated metric, construct a Dirichlet distribution having one dimension for each of the historical data values and each of the received new data values, wherein distribution parameters of the Dirichlet distribution corresponding to the historical data values are the historical weight, and distribution parameters of the Dirichlet distribution corresponding to the received new data values are a new weight, wherein the new weight is at least as large as the historical weight, infer corresponding central tendencies of samplings of a metric distribution, wherein each central tendency of the corresponding central tendencies is determined by sampling the Dirichlet distribution, construct an overall utility distribution for each arms of the A/B test by combining the central tendency of each sampling of the metric distribution with a corresponding sampling of a conversion probability distribution, determine a winning arm of the A/B testing by comparing the overall utility distribution of each arm with each other arm of the A/B test, and electronically communicate with recipients of the computing devices using a template based on the winning arm of the A/B testing.

Other aspects and advantages of the described embodiments will become apparent from the following detailed description, taken in conjunction with the accompanying drawings, illustrating by way of example the principles of the described embodiments.

DETAILED DESCRIPTION

The embodiments described include methods, apparatuses, and systems for determining winning arms of electronic testing for a metric using resampling-based Bayesian nonparametrics. At least some of the described embodiments are integrated into the practical application of determining winning arms of A/B testing. At least some of the described embodiments for A/B testing include integrating the processes for improving the computing of winning arms of electronic testing of electronic communications on a computer or server. Accordingly, the operation of the computers or servers that are configured to execute at least some of the described processes for A/B testing are functionally improved. That is, the A/B testing is improved, and the computing of the A/B testing is improved. At least some embodiments improve the computational purpose by determining an approximate sample size needed for A/B testing arbitrary metrics without requiring user intervention. Further, the described embodiments accurately determine a probability of a variation of the A/B testing winning when using arbitrary numerical metrics. For at least some embodiments, any metric can be (accurately) used for the A/B testing. Further, for at least some embodiments, a user (operator of the A/B testing) does not need to be solicited for extra information. For at least some embodiments, statistical estimates of the A/B testing are more accurate than a one-size-fits-all solution. Further, at least some of the described embodiments for A/B testing (computational purpose) are faster than typical A/B testing solutions for arbitrary numerical metrics because posterior metric distributions are determined using fast operations (computing histograms and conjugate prior formula) compared to typical means (Markov chain Monte Carlo or approximate Bayesian inference). Arbitrary numerical metrics are numerical values that are used to measure or evaluate something, but which have no intrinsic or objective meaning. At least some of the described embodiments allow for unlimited metrics, and do not require user solicitation, because the described embodiments use a flexible distribution representation informed by historical data.

Figure 1:
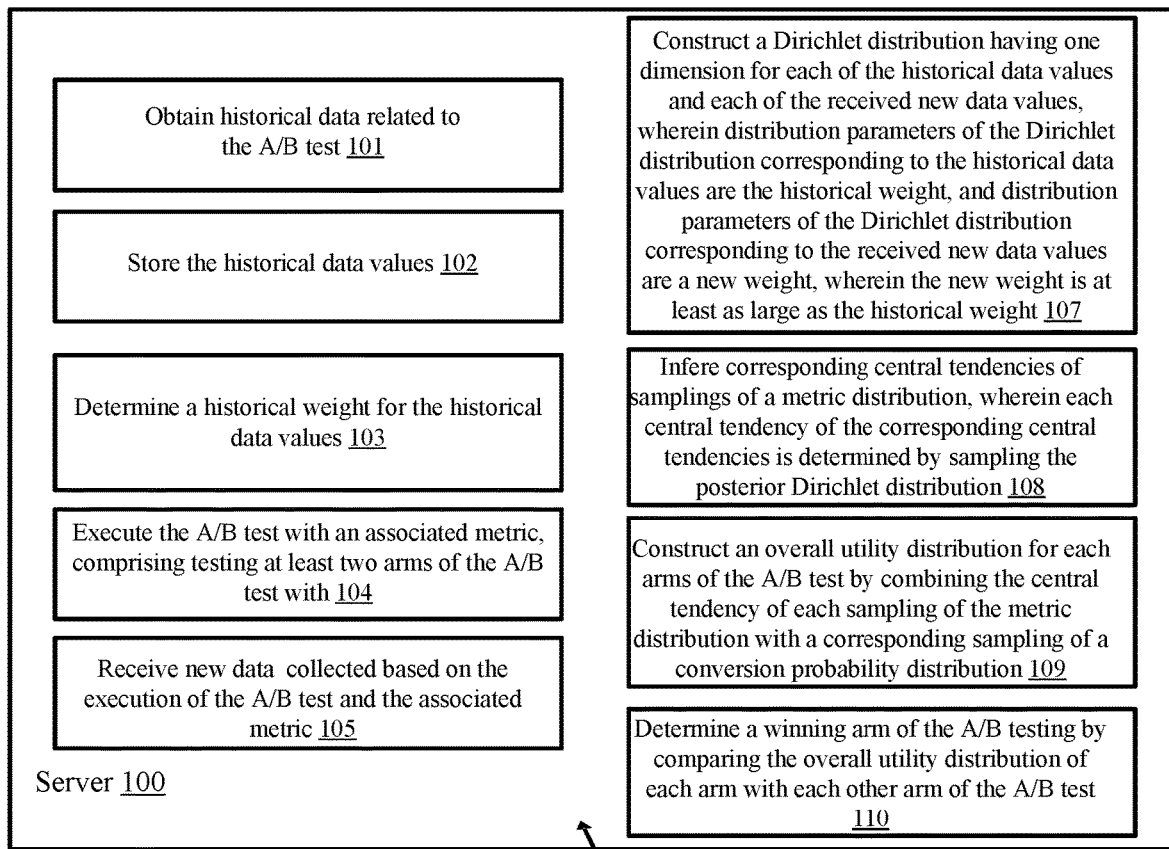
FIG. 1 shows a system for determining winning arms of electronic testing, according to an embodiment.
Figure 1:
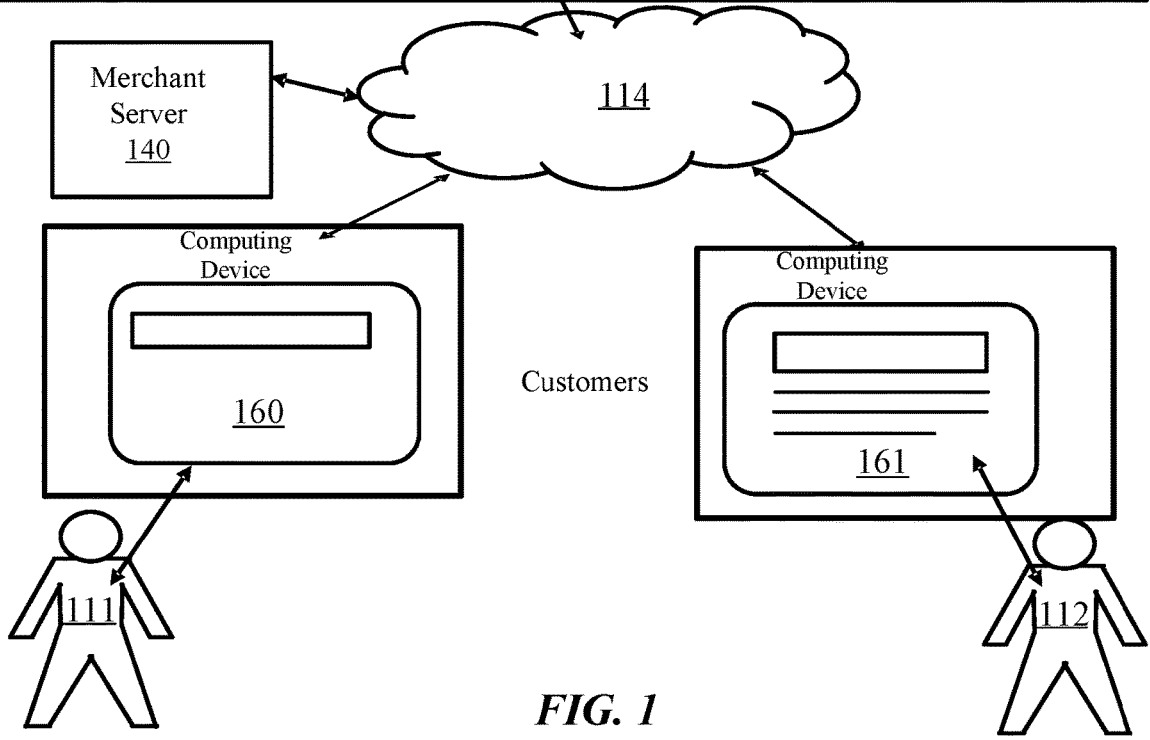

FIG. 1 shows a system for determining winning arms of electronic testing, according to an embodiment. As shown, a system server 100 is configured to select a winner of an A/B test. For an embodiment, the selection process includes obtaining 101 historical data related to the A/B testing. The historical data may include, for example, purchase order values from the last 6 months of customers (for example, users 111, 112) of a merchant that manages a merchant server 140. For an embodiment, computing devices 160, 161, and the merchant server 140 are connected through a network 114 to the server 100. For an embodiment, the historical data for a numerical metric (such as, purchase order values) and for an electronic message type (that is, for email, SMS (small messaging system) etc.) may be the set of purchase order values attributed to the electronic message (communication) sent. However, the historical data can include any data related to an action taken by a recipient (for example, a customer) due to the electronic communication to the recipient. The actions include sensed electronic action, or as will be described, other sensed physical and/or electronic actions performed by the recipient due the electronic communication to the recipient.

A/B Testing

A/B testing, also known as split testing, refers to a randomized experimentation process wherein two or more versions of a variable (forms, electronic messages, websites, web pages, page element, etc.) are shown to different segments of website visitors, recipients of electronic forms, or recipients of electronic messages at the same time to determine which version leaves the maximum impact and drives business metrics. Examples of forms of electronic messaging that may implement the A/B testing includes, for example, website content, email, mobile messaging, SMS (Short Message Service), WhatsApp®, WeChat®, Facebook Messenger®, and similar platforms that enable textual communication. Specific embodiments include, for example, variations (at least A and B) of templates that configure an electronic message, an electronic form, or a website.

After obtaining the historical data, for an embodiment, the system server 100 is further configured to store 102 the historical data values.

After storing the historical data, for an embodiment, the system server 100 is further configured to determine 103 a historical weight for the historical data values. For an embodiment, the historical weight controls the "relevancy" of historical data values. That is, if the historical weight is close to 0, then historical data does not matter much at all, and if the historical weight is the same as a new weight for new data values then the historical data is "the same as" new data from an A/B test. Since the historical data is expected to be similar in distribution but not identical to the new data from the A/B test, choosing a weight in between 0 and the new weight used for the A/B test data is ideal.

Various different embodiments can be used for determining the historical weight. For an embodiment, determining the historical weight includes first choosing an arbitrary initial pair of weights (historical data weight and new weight (described later)) where 0<historical data weight<new weight<some upper bound close to 4. The upper bound on the new data weight of 4 has been found to result in inferences that are lower variance. Second, users (merchants) are allowed to run A/B tests according to the described embodiments and collect data for the A/B tests. Third, decide a metric for optimizing the A/B testing procedure with respect to the pair of weights (historical weight and new data weight). For example, the metric may be the fraction of the time that the A/B testing procedure indicated a statistically significant result for a test that ended up being truly significant. Fourth, for any number of candidate pairs of weights, the optimization metric is evaluated by using collected data and the candidate weights.

At least some other embodiments include other ways for determining the pair of weights including determining the weights based on theoretical properties given parametric assumptions or simulations of the A/B testing process using simulated data according to those assumptions.

A/B testing determination utilizing the Dirichlet distribution to model a metric density is very fast. For at least some embodiments, a Dirichlet distribution is preferable because (1) it appropriately represents uncertainty in the frequencies of non-overlapping categories or bins and (2) updating this uncertainty using observed frequencies is fast and simple. Usage of a Dirichlet distribution in tandem with a histogram to represent numerical metric probability densities is novel and non-obvious because other solutions use parametric densities (such as Gaussian or Gamma distributions) or other non-parametric distributions (such as Dirichlet process mixture distributions). Usage of the Dirichlet distribution for fast non-parametric density estimation with the usage of a corresponding prior is novel and non-obvious by itself. While the Bayesian bootstrap method exists in literature, it is novel to use historical data points in tandem with the bootstrap-like method.

It is to be understood that at least some embodiments include creating other types of distributions. That is, other embodiments may include a distribution other than a Dirichlet distribution. With or without using a Dirichlet distribution specifically, the uniqueness of the described embodiments is in the combination of the methods and the application. Specifically, the described embodiments include the creation of a density model (model of metric values). For example, a model of what purchase values occur and how often and a frequency model (distribution of a (conversion) probability) of the metrics previously tracked through the historical data and being applied to electronic A/B testing. While referred to as a "frequency model" this model may be more generally referred to as a "model of the probability of recipients taking action".

At least some embodiments include the use of the Dirichlet distribution to model the metric density. These embodiments are very fast since applying the conjugate prior formulae is fast. Accordingly, A/B testing determination utilizing the Dirichlet distribution to model the metric density is very fast. It is common practice in applied statistics to represent densities with a parametric distribution, such as a Gamma distribution. However, these are slow to update and are inflexible, so the resulting density models are inaccurate. It is to be understood that Gamma distributions are not comparable to Dirichlet distributions. While they are both probability distributions, the Gamma distribution directly represents a numerical distribution whereas the Dirichlet distribution represents uncertainty over the frequencies of non-overlapping categories and for the described embodiment is combined with numerical value indicators (such as the center of histogram bins) to represent numerical distributions.

Dirichlet Distribution

In probability and statistics, the Dirichlet distribution is a family of continuous multivariate probability distributions parameterized by a vector of positive reals. It is a multivariate generalization of the beta distribution, hence its alternative name of multivariate beta distribution (MBD). Dirichlet distributions are commonly used as prior distributions in Bayesian statistics, and in fact, the Dirichlet distribution is the conjugate prior of the categorical distribution and multinomial distribution.

For an embodiment, the A/B test with an associated metric is executed 104. The associated metric can include, for example, submit rate of a form, or some customer action to be sensed based on the customer being subjected to each of the arms. For an embodiment, the A/B test includes testing at least two arms (test variations, such as, template variations, form variations, etc.) of the A/B test. For an embodiment, the A/B testing further includes a user profile, which may include, for example, message recipients.

For an embodiment, the A/B test includes testing of at least one of websites, forms, templates of emails, or templates of mobile messages. As previously described, examples of forms of electronic messaging that may implement the A/B testing includes, for example, SMS (Short Message Service), WhatsApp®, WeChat®, Facebook Messenger®, and similar platforms that enable textual communication.

After execution of the A/B test, for at least some embodiments, the server 100 is further configured to receive 105 new data collected based on the execution of the A/B test and the associated metric. Exemplary metrics include a purchase value (for ecommerce), time spent on an application (for software), and/or test scores (for education). For an embodiment, collecting new data includes sensing customer actions associated with the metric for at least two arms of the A/B test. As will be described, the sensed customer actions can include any action performed by the customer (recipient) due to the customer (recipient) having received the electronic communication of the A/B test. The sensed customer actions can include sensing physical actions of the customer, such as, actions sensed by electronic sensor(s) located on a computing device of the customer (recipient). Such sensors (global positioning systems, accelerometers, gyroscopes, accelerometers, etc.) can sense physical motion of the customer (recipient) resulting in response to the customer (recipient) having received the electronic communication. The sensed physical motion can be used to detect a customer visiting a physical location of a merchant and actions of the customer within the physical location of the merchant, such as, physically touching, holding, or moving a product of the merchant at the location of the merchant. For at least some embodiments, the sensed customer actions are digital actions, such as, navigating to a website, spending time or money on an application. For at least some embodiments, the sensed customer actions include a combination of both physical motions/actions by the electronic message recipient (customer) and digital actions by the electronic message recipient (customer).

As described, the A/B testing can include the testing of electronic communications from a merchant to customers of the merchant. For an embodiment, the different arms of the testing are variations of one of different types of the electronic communication, and the measured results (new data) of the testing includes actions of the recipients of the electronic communications testing as a result of having received the different arms of the electronic communications testing. As previously described, the different electronic communications may include forms, mobile messages, and/or electronic messages. The A/B testing may include variations of templates of forms, variations of templates of mobile messages, and/or variations of templates of electronic messages.

Templates of Forms

For an embodiment, the A/B testing includes N variations (arms) of templates that define forms. That is, the electronic communication to the customer (recipient) includes an electronic form. For an embodiment, each of N templates includes a set of data objects that combine to represent a structure of a form. For an embodiment, the first and second templates of the N templates of the form each have a different content or behavior. Accordingly, the set of data objects of each of the first and second templates combine to represent a structure of forms having a different content and/or behavior. The structure of a form includes the content and the behavior. For an embodiment, the templates additional include information pertaining to testing of the form(s). The additional information can include, for example, a test name, a description of the test (makes it easier to remember what is being tested), an ending date, and/or specific settings that correspond to statistical significance criteria. For an embodiment, the additional information pertaining to the testing combined with the data for the templates define a test For an embodiment, the server 100 operates to assign a respective group of site visitors (which then may become recipients) to the first template of the form and the second template of the form, wherein the assigning is random. For an embodiment, the site visitors are obtained by tracking information of visitors to the customer website managed by the merchant server 140. For an embodiment, the site visitors include recent site visitors. For an embodiment, recent site visitors include site visitors that have visited the customer website within a predetermined time-period. For an embodiment, recent site visitors include a selected number of most recent site visitors. For an embodiment, recent site visitors) include site visitors who are qualified to view since a testing of templates has begun. For an embodiment, recent site visitors include site visitors since a specific event. For an embodiment, the specific event may include, for example, a large change in the settings of a template test.

For an embodiment, the server 100 further operates to determine automatically whether the first template of the form is statistically more advantageous than the second template of the form. For an embodiment, the server 100 operating to determine the statistical advantage includes using the A/B testing of the described embodiments, wherein the first template is a first arm of the testing and the second template is a second arm of the testing. Generally, an electronic communication with a statistical advantage is better at soliciting a desired response from a recipient of the electronic communication.

Figure 2:
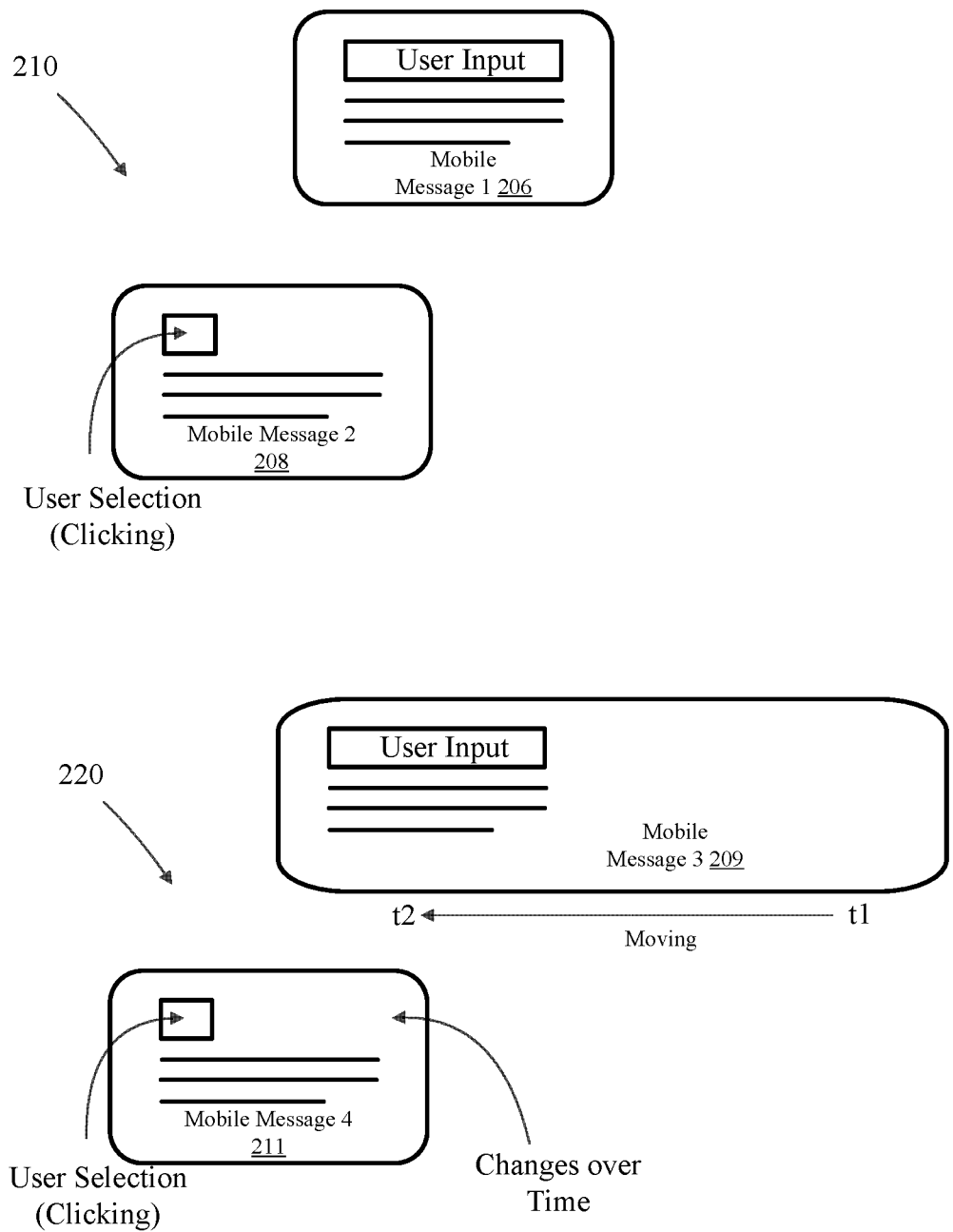
FIG. 2 shows templates of a mobile message, an electronic message, or a form, wherein each temple includes different content or behavior, according to an embodiment.

FIG. 2 shows templates of a mobile message, an electronic message, or a form, wherein each temple includes different content, behavior or send time, according to an embodiment. A first website display 210 includes a form, mobile message, or electronic message 206 that requires an input from a user (site visitor), and a form 208 that requires a user input through, for example, a selection, such as, through a mouse click. A second website display 220 includes a form 209 that changes positions on the display between times t1 and t2, and a form 211 that "pops up" a time t3 after the webpage has been loaded. Clearly, other forms having different content and behavior can be utilized. As shown, for an embodiment, the different templates operate to control a display of the form(s) on a display of a computing device (such as, computing devices 160, 161) of users (such as, customers (recipients) 111, 112). As stated, for an embodiment, the different forms provide the electronic communications of the A/B testing.

For an embodiment, the form includes a file configured to receive an input from a site visitor. For an embodiment, the required input includes at least one or more of the customer (site visitor) clicking to a different page, or the customer entering information. For an embodiment, the form is distinct from an underlying website which may include a dynamic and interactive page. For an embodiment, the forms of the templates are distinct from the underlying website because the forms appear visually and/or behaviorally distinct from the underlying page. For example, the behavior of the form may include the form popping up after the page is loaded or sliding out from the side after the rest of the page has been loaded. As previously described, the different templates of the A/B test control the behavior of the form, and accordingly, control the display of a recipient of the form.

Templates of Mobile Messages

For an embodiment, the A/B testing includes N variations (arms) of templates that define mobile messages. For an embodiment, each of N templates includes a set of data objects that combine to represent a structure of a mobile message. As described, the first and second templates of the N templates of the mobile message each have a different content, a different send time, and/or a different behavior. The different displays of the mobile message can include a changing display, such as, movement or varying display intensity. Accordingly, the set of data objects of each of the first and second templates combine to represent a structure of mobile message having a different content, different send times, or different behavior of the mobile messages. For an embodiment, the structure of the mobile message includes the content, the send time, or the behavior control. For an embodiment, the templates additional include information pertaining to testing of the mobile message(s). The additional information can include, for example, a test name, a description of the test (makes it easier to remember what is being tested), an ending date, and/or specific settings that correspond to statistical significance criteria. For an embodiment, the additional information pertaining to the testing combined with the data for the templates define a test.

For an embodiment, the messages 206, 208, 209, 211 may be mobile messages. For an embodiment, the mobile messages require an input. A first display of a mobile device of a mobile message recipient includes a mobile message 206 that requires an input from a user (mobile message recipient) and a mobile message 208 that requires a user input through, for example, a selection, such as, through a click. A second display includes a mobile message 209 that changes on the display between times t1 and t2, and a mobile message 211 that is delivered a time t3 after the mobile message has been sent. Clearly, other mobile messages having different content, send times, and behavior can be utilized. For an embodiment, templates that have different send times are sent to the mobile message recipients at different times. For an embodiment, a different send time of the first template and the second template include a first send time for the first template and a second send time of the second template. For an embodiment, messages received at different times during the day may be more or less likely to achieve success, based on trends observed in both mobile messages and email. That is, mobile message recipient behavior can be observed by prior mobile messages to the mobile message recipient, or other types of electronic mail sent to the mobile message recipient. Based on the observer prior behavior of the mobile message recipient, the first and second send times can be selected. Further, there can be legal restrictions on send times, which influence the times the server selects for the first and second send times.

For an embodiment, the mobile message includes a file configured to receive an input from a mobile message recipient. For an embodiment, the required input includes at least one or more of the customers (site visitor) clicking to a different page, or the customer entering information. However, as previously mentioned, sensors of mobile devices of the mobile message recipients can be utilized to determine or detect actions of the mobile message recipients that indicate changes in behavior of the mobile message recipient due to receiving the mobile messages of the different templates.

An embodiment includes counting the successes of the mobile message sent to mobile message recipients of, for example, a group 1 and a group 2 according to a template 1 and a template 2. As previously described, for an embodiment, successes of the mobile messages generally include determining how many of the mobile message recipients of the mobile messages are tracked or determined to have performed a task of the mobile message. For an embodiment, the tracked and monitored activities of the mobile message recipients are online activities. For an embodiment, mobile devices of the mobile message recipients are tracked, and the tracked and monitored activities include locations and motions of the mobile message recipients.

For an embodiment, the mobile message recipients are obtained by tracking information of mobile message recipients to the customer website managed by a marketing manager of the merchant server 140. For an embodiment, the mobile message recipients include recent mobile message recipients. For an embodiment, recent mobile message recipients include site mobile message recipients that have visited the customer website within a predetermined time-period. For an embodiment, mobile message recipients include a selected number of most recent customer website visitors. For an embodiment, recent site visitors include mobile message recipients since a specific event. For an embodiment, the specific event may include, for example, a large change in the settings of a template test. For an embodiment, the assignment is random with equal probabilistic distributions within each geographical region that the test is sent to. For example, the mobile message may be sent to mobile message recipients from N different geographical regions. For an embodiment, an equal number (or near equal) of mobile messages is sent to each of the geographical regions, but randomly sent to the mobile message recipients within each of the regions. For an embodiment, the assignment is deterministic but equally distributed within each of the geographical regions. For example, a first template 1 can be assigned to a first member of the list of planned mobile message recipients, a second template 2 can be assigned to a second member of the list of planned mobile message recipients, and the first template can be assigned to a third member of the list of planned mobile message recipients, and so on.

For at least some embodiments, an eligibility of the mobile message recipient is determined dynamically by a combination of a geolocation of the mobile message recipient, transactional (for example, purchase confirmation, delivery confirmation) vs. marketing purpose of the mobile message, and recency of the last marketing mobile or email message received. For example, only mobile message recipients who have not received a marketing email and/or marketing mobile message within the past 24 hours (or some other predetermined or adaptive time period X) are eligible to receive this message. For an embodiment, the planned mobile message recipients are determined when a mobile message is scheduled for transmission to the mobile message recipients. For an embodiment, when the mobile message is sent, the time that each planned mobile message recipient received their most recent marketing mobile message is determined, and only those mobile message recipients that have not received a marketing mobile message in the past X hours are deemed eligible mobile message recipients.

For an embodiment, content in the template(s) is dynamically updated based on actions or characteristics of the user. For example, different images or content of mobile messages of the templates are sent to the mobile message recipients based on the last product that a mobile message recipient browsed. Further, the mobile devices of the mobile message recipients can be tracked and monitored. For an embodiment, the content of the templates is additionally updated by physical location and activities of the mobile message recipients. The physical location and the activities can be sensed and/or identified based on locations and motion sensed by sensors of the mobile devices of the mobile message recipients.

For an embodiment, at least one of the plurality of mobile devices includes a location sensor and one or more motion sensors, and wherein the at least one of the plurality of mobile devices tracks locations and motions of a user of the at least one of the plurality of mobile devices, and the locations and motions of the user are included in the collected test data from the testing including the mobile message recipient actions of the first template of the mobile message and the second template of the mobile message.

Templates of Electronic Messages

For an embodiment, the A/B testing includes N variations (arms) of templates that define electronic messages. For an embodiment, each of N templates includes a set of data objects that combine to represent a structure of an electronic message. As described, the first and second templates of the N templates of the electronic message each have a different content. Accordingly, the set of data objects of each of the first and second templates combine to represent a structure of electronic messages having a different content. The structure of an electronic message includes the content. For an embodiment, the first and second templates determine content and of electronic messages to be tested. The testing of the template defined message includes additional information pertaining to the testing of the electronic message(s). The additional information can include, for example, a test name, a description of a test (makes it easier to remember what is being tested), an ending date, and/or specific settings that correspond to statistical significance criteria. For an embodiment, the additional information pertaining to the testing combined with the data for the templates define a test.

For an embodiment, the server 100 operates to continuously send a main electronic message, wherein at least a content of the main electronic message is determined by a main message template. That is, a previously selected template is designated as the main template that defines the main electronic message being sent to, for example, computing devices 160, 161.

For an embodiment, the server 100 operates to create a plurality of test templates including at least an A template and a B template. Once created, for an embodiment, the server 100 further operates to initiate testing of test electronic messages, wherein at least a content of one test electronic message is determined by the A template, and at least the content of another of the test electronic message is determined by the B template.

For an embodiment, the messages 206, 208, 209, 211 may more generally be electronic messages. FIG. 2 shows a system for testing of templates of electronic messages that includes switching 221 to electronic messages of winning templates, according to an embodiment. That is, for an embodiment, the server 100 is further configured to switch between the sending of the main message and the sending of the test messages, wherein no customer of the merchant receives both the main message and any one of the test messages (mutual exclusivity) and all customers receive at least one of the main message or one of the test messages.

Other Electronic Communications

For an embodiment, the messages 206, 208, 209, 211 are push notifications. For an embodiment, the push notifications are notifications from applications on (usually) loaded on mobile devices. For example, a restaurant chain may include push notifications from their application that is loadable to a mobile device of a user (recipient) that notifies users of special offers.

For an embodiment, the messages 206, 208, 209, 211 are websites or configurations of subcomponents on a website. For example, ecommerce merchants may A/B test the layout of a landing page (this is the tested "template" or "arm") to optimize purchases or website engagement.

Sensed Customer Actions

For an embodiment, successes include the electronic communication recipient(s) carrying out a main action that an electronic communication is intended to elicit, such as, for example, clicking a link in the electronic message (potentially embedded in an image), or making a purchase on the website linked to in the electronic message. It is to be understood, however, that successes need not be "desired" actions, since the goal of A/B testing may be in fact to find the variation/template/arm that minimizes or maximizes some action. For example, if the sensed action is a message recipient smoking an ecigarette, then the goal of A/B testing may be to prevent that action. At least some embodiments include electronically sensing whether the electronic message recipient has performed the main action (such as, making a purchase based on reception of the electronic message). Further, electronic message recipients may receive the electronic messages via mobile device, such as, a cellular phone. Accordingly, physical actions of the electronic message recipients can be tracked to determine whether the electronic message recipient(s) carried out a main action that the electronic message is intended to elicit. That is, sensors, such as, location sensors, such as, GPS (global positioning system) sensors, and/or motion sensors (such as, accelerometers, gyroscopes, and/or magnetic sensors) can be used to track the locations and actions of the electronic message recipient(s) to determine whether the electronic message recipient(s) performed the main action (such as, purchasing a product of the merchant) or another action. Selected sequences of actions by the recipient can be used to determine whether the received electronic communication caused an action by the recipient.

After execution of the A/B test and collection of new data generated by the A/B testing, for an embodiment, the system server 100 is further configured to construct 107 a Dirichlet distribution having one dimension for each of the historical data values and each of the received new data values, wherein distribution parameters of the Dirichlet distribution corresponding to the historical data values are the historical weight, and distribution parameters of the Dirichlet distribution corresponding to the received new data values are a new weight, wherein the new weight is at least as large as the historical weight.

For an embodiment, the new weight controls "how likely" each data point is to be sampled when sampling the Dirichlet-Multinomial distribution corresponding to the Dirichlet distribution. That is, if the weight is a very high value, then every point is certain to be sampled an equal number of times when drawing from a Dirichlet-Multinomial distribution (equivalently, points are certain to be sampled with equal weights when sampling from a Dirichlet distribution). The so-called "Bayesian bootstrap" refers to essentially the same process as the described embodiments (i.e. constructing a Dirichlet distribution with as many dimensions as data points and distribution parameters equal to one fixed value and then sampling the Dirichlet distribution to estimate uncertainty of statistics of that set of data) except without using any historical data points. So, that literature can be drawn from to determine this weight.

For an embodiment, a Beta distribution is a distribution over probabilities or values between 0 and 1. For an embodiment, a Dirichlet distribution is a generalization of a Beta distribution with more than 2 options/dimensions. A 2-dimensional Dirichlet distribution is equivalent to a Beta distribution: a sample from the Dirichlet distribution could be the pair (0.1, 0.9) [the sum must be 1], which is equivalent to sampling 0.1 from a Beta distribution. For an embodiment, the Dirichlet distribution is used to sample weights for empirically observed values, which roughly corresponds to how likely it would be for that value to be observed relative to other values. With 4 values (1, 30, 11, 2) and samples from the Dirichlet distribution with the weights (0.1, 0.2, 0.6, 0.1) then the value 1 has a weight of 0.1, the value 30 has a weight of 0.2, and so on. A d-dimensional Dirichlet distribution has d parameters, which correspond to how likely that value is relative to other values. The 4-dimensional example above has parameters (0.1, 10_000, 1, 2), then samples like (0.005, 0.99, 0.001, 0.004) where the second dimension's weight is high are very likely. Scaling all parameters linearly results in less variation in the samples. So if the parameters were (0.01, 1_000, 0.1, 0.2), then it would be more likely to sample samples where the second dimension's weight is lower than other dimensions' weights. For the described embodiments, similar to how it is used in "the Bayesian bootstrap" method, samples are used to create weighted re-samplings of a finite sample of values so that when repeatedly sampling weights and evaluating weighted statistics, the variation in those statistics resemble the variation in the statistics when drawing a finite sample from an unknown population distribution.

After computing the posterior Dirichlet distribution, for an embodiment, the system server 100 is further configured to infer 108 corresponding central tendencies of samplings of a metric distribution, wherein each central tendency of the corresponding central tendencies is determined by sampling the posterior Dirichlet distribution. For an embodiment, the central tendencies include averages. For an embodiment, the metric distribution includes purchase values. Accordingly, the central tendency of the samplings of the metric distribution could be the average purchase value among those (recipients or customers) that purchase. For an embodiment, the sampling includes a set of frequencies that refer to a likelihood of observing corresponding histogram bins. For an embodiment, each time the Dirichlet distribution is sampled, a set of bar heights for that histogram are generated, wherein the bar height represents a frequency of getting the bin of the bar. For the description here, "frequency" is a synonym for "probability" or "likelihood". For example, inferring the central tendency of a sampling ([0.3, 0.6, 0.1]) for histogram bins (0-10, 10-20, 20-30) could be performed by summing the sampling values (weights) times the corresponding bin midpoints (0.3*5+0.6*15+0.1*25)).

For an embodiment, inferring the central tendency of the posterior metric distribution of the posterior Dirichlet distribution includes sampling the posterior Dirichlet distribution to create values for each bin, and computing a sample mean for each bin comprising summing a center point of endpoints of each bin multiplied by a corresponding created value of the bin. For an embodiment, the sampling of the posterior Dirichlet distribution to create values for each bin provides a prediction of how frequently the bin would occur in an actual distribution of the new data.

After inferring the central tendency for each sampling of the posterior metric distribution of the posterior Dirichlet distribution, for an embodiment, the system server 100 is further configured to construct 109 an overall utility distribution for each arms of the A/B test by combining the central tendency of each sampling of the metric distribution with a corresponding sampling of a conversion probability distribution, and determine 110 a winning arm of the A/B testing by comparing the overall utility distribution of each arm with each other arm of the A/B test. For an embodiment, the overall utility distribution includes an average purchase value per recipient or customer. For an embodiment, the conversion probability is a probability of a message recipient performing some action. For an embodiment, the conversion probability is selected based on the historical frequency of message recipients performing the action.

Arms

For an embodiment, a multi-arm experiment also known as multi-group A/B/n testing includes simultaneously testing more than one variation. For an embodiment, multi-arm testing involves two or more test groups (that is, A and B), and a control group (that is. C). This allows comparing A against C at the same time as B against C, thus reusing the control group. This also affords a head-to-head comparison between the test groups (A vs B) to evaluate differences or identify a clear statistical winner. This provides a powerful experimental tool that can reduce sample size, costs, and time, while testing multiple hypotheses in parallel.

For an embodiment, the winning arm is selected as a user default. That is, for example, the winning arm is used as the default for whatever electronic form, electronic messaging, or electronic communication is being used to interact with a customer or user. For example, for the electronic forms, emails, messages or website that is being tested, the winning arm is used for the electronic form, email, message or website being communicated, for example, to one or more customers.

For an embodiment, selecting the weighting of distributions of customers that are recipients of each of the arms is selected based on the overall utility distribution for each of the arms of the A/B test. That is, during the A/B testing percentages of possible recipients of the A/B testing are allocated as recipients of the "A" test and recipients of the "B" test. For an embodiment, the percentages of the allocations are adjusted based on the overall utility distribution. As an example: utility distributions may be collectively sampled to estimate the fraction of the time one arm would win. This fraction may be used as the allocation percentage for this arm. This is referred to as Thompson sampling.

An embodiment includes ending the A/B test and selecting a winning arm based on the overall utility distribution for each of the arms of the A/B test. That is, based on the overall utility distribution for each of the arms of the A/B test, a statistical "winner" of the A/B testing can be identified.

Figure 3:
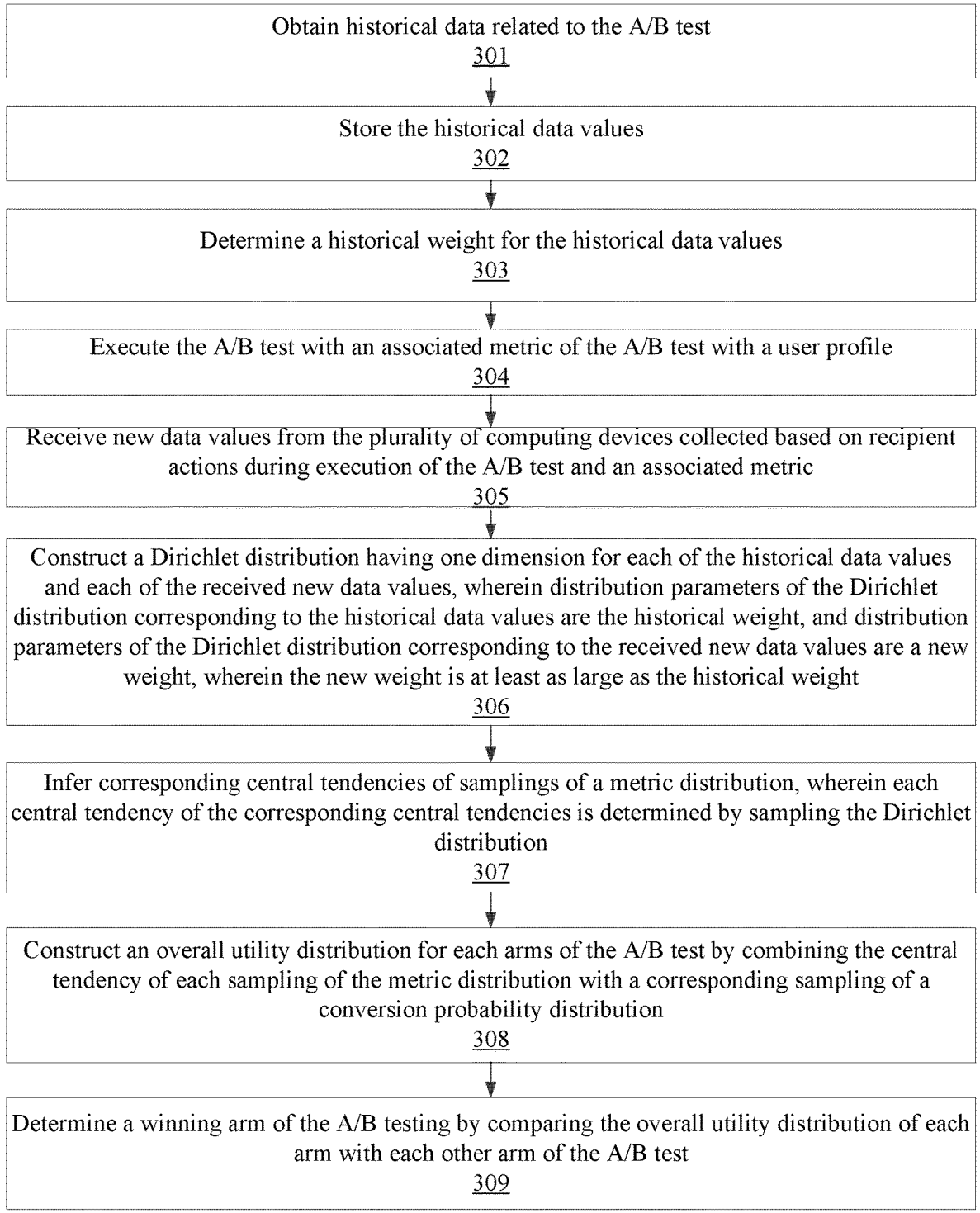
FIG. 3 is a flow chart that includes steps of a method for selecting a winner of an A/B test, according to an embodiment.

FIG. 3 is a flow chart that includes steps of a method for selecting a winner of an A/B test, according to an embodiment. A first step 301 includes obtaining historical data related to the A/B test. A second step 302 includes storing the historical values.

A third step 303 includes determining a historical weight for the historical data values. As previously described, Various different embodiments can be used for determining the historical weight. For an embodiment, determining the historical weight includes first choosing an arbitrary initial pair of weights (historical data weight and new weight (described later)) where 0<historical data weight<new weight<some upper bound close to 4. The upper bound on the new data weight of 4 has been found in testing and simulation to result in inferences that are lower variance. Second, users (merchants) are allowed to run A/B tests according to the described embodiments and collect data for the A/B tests. Third, decide a metric for optimizing the A/B testing procedure with respect to the pair of weights (historical weight and new data weight). For example, the metric may be the fraction of the time that the A/B testing procedure indicated a statistically significant result for a test that ended up being truly significant. Fourth, for any number of candidate pairs of weights, the optimization metric is evaluated by using collected data and the candidate weights.

At least some other embodiments include other ways for determining the pair of weights including determining the weights based on theoretical properties given parametric assumptions or simulations of the A/B testing process using simulated data according to those assumptions.

A fourth step 304 includes executing the A/B test with an associated metric of the A/B test with a user profile. For an embodiment, the user profile includes electronic message recipients.

A fifth step 305 receiving new data values from the plurality of computing devices collected based on recipient actions during execution of the A/B test and an associated metric.

A sixth step 306 includes constructing a Dirichlet distribution. As previously described, for an embodiment, the new weight controls "how likely" each data point is to be sampled when sampling the Dirichlet distribution. That is, if the weight is a very high value, then every point is certain to be sampled an equal number of times when drawing from a Dirichlet-Multinomial distribution (equivalently, points are certain to be sampled with equal weights when sampling from a Dirichlet distribution). A "Bayesian bootstrap" refers to a process that includes constructing a Dirichelt distribution with as many dimensions as data points and distribution parameters equal to one fixed value and then sampling the Dirichlet distribution to estimate uncertainty of statistics of that set of data except without using any historical data points.

For an embodiment, a Beta distribution is a distribution over probabilities or values between 0 and 1. For an embodiment, a Dirichlet distribution can be thought of as a Beta distribution to more than 2 options/dimensions. A 2-dimensional Dirichlet distribution is in fact equivalent to a Beta distribution: a sample from the Dirichlet distribution could be the pair (0.1, 0.9) [the sum must be 1], which is equivalent to sampling 0.1 from a Beta distribution. For an embodiment, the Dirichlet distribution is used to sample weights for empirically observed values, which roughly corresponds to how likely it would be for that value to be observed relative to other values. With 4 values (1, 30, 11, 2) and sampling from the Dirichlet distribution the weights (0.1, 0.2, 0.6, 0.1) then the value 1 has a weight of 0.1, the value 30 has a weight of 0.2, and so on. An d-dimensional Dirichlet distribution has d parameters, which correspond to how likely that value is relative to other values. With the 4-dimensional example above having parameters (0.1, 10_000, 1, 2), then samples like (0.005, 0.99, 0.001, 0.004) where the second dimension's weight is high are very likely. Scaling all parameters linearly results in less variation in the samples. If the parameters were (0.01, 1_000, 0.1, 0.2), then it would be more likely to sample samples where the second dimension's weight is lower than other dimensions' weights. For the described embodiments, similar to how it is used in "the Bayesian bootstrap" method, samples are used to create weighted re-samplings of a finite sample of values so that when repeatedly sampling weights and evaluating weighted statistics, the variation in those statistics resemble the variation in the statistics when drawing a finite sample from an unknown population distribution.

A seventh step 307 includes inferring corresponding central tendencies of samplings of a metric distribution, wherein each central tendency of the corresponding central tendencies is determined by sampling the posterior Dirichlet distribution. An eighth step 308 includes constructing an overall utility distribution for each arm of the A/B test by combining the central tendency of each sampling of the metric distribution with a corresponding sampling of a conversion probability distribution. A ninth step 309 includes determining a winning arm of the A/B testing by comparing the overall utility distribution of each arm with each other arm of the A/B test.

For an embodiment, the inferred corresponding tendencies include an average of the samplings of the metric distribution. For an embodiment, the metric distribution includes a distribution of purchase values. For an embodiment, the central tendency of the samplings of the metric distribution is the average purchase value among those that make a purchase. For an embodiment, each time the Dirichlet distribution is sampled, a set of weights for the historical and new values is generated.

For an embodiment, constructing an overall utility distribution includes determining an average purchase value per recipient. For an embodiment, the conversion probability is the probability of a message recipient performing some action which is based on the historical frequency of message recipients performing the action.

For an embodiment, the winning arm of the A/B testing is the arm that most frequently has the highest sampled utility when sampling the utility distribution of each arm.

With or without using a Dirichlet distribution specifically, the uniqueness of the described embodiments is in the combination of the methods and the application. Specifically, the described embodiments include the creation of a density model and a frequency model (distribution of a (conversion) probability) of the metrics previously tracked through the historical data, and the application being electronic A/B testing.

However, at least some embodiments include the use of the Dirichlet distribution to model the metric density, and the use of the conjugate prior formulae. These embodiments are very fast. For example, the use of the Dirichlet methods described can reduce processing to milliseconds versus a few seconds for an MCMC (Markov Chain Monte Carlo) or variational inference. To further elaborate, it is common practice in applied statistics to represent densities with a parametric distribution, such as a Gamma distribution. However, these are slow to update and are inflexible, so the resulting density models are inaccurate.

As previously described, for an embodiment, the testing and communicating with testing recipients includes variations (arms) based on variation of templates. Further, for an embodiment, the winning arm (template) is used for future electronic communication with the recipients after the A/B testing.

For an embodiment, the winning arm is an arm that most frequently has a highest sampled utility when sampling the overall utility distribution of the arm. As previously described, for an embodiment, the A/B test includes testing of at least one of websites, a form, templates of emails, or templates of mobile messages, (SMS/MMS and Push notifications), wherein a first template defines an A version of the template, and a second template defines a B version of the template. As previously described, for an embodiment, each arm of the A/B testing includes a template of at least one of a form, an email, or a mobile message, including an A template and a B template, wherein each template includes a set of data objects that combine to represent a structure of the form, the email, or the mobile message, wherein the A template and the B template of the form, the email, or the mobile message each have a different content, behavior, or send time. As previously described, for an embodiment, the different behavior includes the form, the email, or the mobile message popping up being loaded or sliding out from a side of a display of a recipient after being loaded. As previously described, an embodiment includes further comprising selecting the winning arm as a user default, wherein the selected user default is used for electronic communications with recipients.

An embodiment includes further selecting weighting of distribution of customers receiving each of the arms based on the overall utility distribution for each of the arms of the A/B test. For an embodiment, the weighting of distribution of each arm is based on how frequently the arm has the highest sampled utility.

As previously described, for at least some embodiments, the associated metric includes at least one of a purchase value, a quantity of items purchased, a number of times software users open an application, an amount of time users spend in an application, etc.

An embodiment includes ending the A/B test based on the overall utility distribution for each of the arms of the A/B test. For example, one arm may be clearly established as the winner, and therefore, the testing may end. For an embodiment, the A/B testing is ended when the overall utility distribution of one arm is a threshold better than each of the other arms.

For an embodiment, inferring corresponding central tendencies of samplings of a metric distribution includes sampling the Dirichlet distribution to create values for each data value, and computing a sample mean for each data value comprising summing a data value multiplied by a corresponding created value of the data value.

For an embodiment, receiving the new data collected based on the execution of the A/B test and the associated metric includes sensing actions of recipients of electronic communications of the A/B test. For an embodiment, sensing actions of the recipients includes sensing physical motion of the recipients including sensing keyboards actions of the recipients, sensing physical motion of the recipients, and tracking locations of the recipients. As previously described, for at least some embodiments, the A/B testing includes testing of at least one of websites, form, templates of emails, or templates of mobile messages, SMS (Short Message Service), WhatsApp®, WeChat®, Facebook Messenger®, and similar platforms that enable textual communication.

As previously described, for an embodiment, the winning arm is selected as a user default. That is, for example, the winning arm is used as the default for whatever electronic form, electronic messaging, or electronic communication is being used to interact with a customer or user. For example, for the electronic form, email, message or website that is being tested, the winning arm is used for the electronic form, email, message or website being communicated, for example, to customers.

As previously described, for an embodiment, selecting the weighting of distributions of customers that are recipients of each of the arms is selected based on the overall utility distribution for each of the arms of the A/B test. That is, during the A/B testing percentages of possible recipients of the A/B testing are allocated as recipients of the "A" test and recipients of the "B" test. For an embodiment, the percentages of the allocations are adjusted based on the overall utility distribution.

As previously described, for an embodiment, ending the A/B test a selecting a winning arm based on the overall utility distribution for each of the arms of the A/B test. That is, based on the overall utility distribution for each of the arms of the A/B test, a statistical "winner" of the A/B testing can be identified.

For an embodiment, inferring corresponding central tendencies of samplings of a metric distribution includes sampling the Dirichlet distribution to create values for each data value, and computing a sample mean for each data value comprising summing a data value multiplied by a corresponding created value of the data value.

For an embodiment, receiving the new data collected based on the execution of the A/B test and the associated metric includes sensing actions of recipients of electronic communications of the A/B test. For an embodiment, sensing actions of the recipients includes sensing physical motion of the recipients including sensing keyboards actions of the recipients, sensing physical motion of the recipients, and tracking locations of the recipients. For an embodiment, obtaining historical data related to the A/B test includes sensing of past actions of recipients related to the A/B test, wherein receiving new data collected based on the execution of the A/B test and the associated metric comprises sensing actions of recipients electronically receiving electronic communications of the A/B test, and further comprising influencing future electronic communications with recipients based on the winning arm of the A/B test.

For an embodiment, sensing actions of the recipients includes sensing, by sensors of computing devices of the recipients, changes in physical location and motion of the recipient that are correlated with receiving the electronic communications, and wherein influencing future electronic communications with the recipient includes selecting the winning template associated with the winning arm of the A/B test, wherein the winning template is used for future electronic communications with the recipients. For an embodiment, the sensors of the computing devices include one or more of a GPS (global positioning system) sensor, a magnetic sensor, an accelerometer, and/or a gyroscope. The sensors operate to sense the physical location and motion of the user (customers) associated with the computing devices. Accordingly, actions (motions and location) of the users can be correlated with the user (customers) receiving the electronic communications. Therefore, changes in location and motion can be correlated with electronic communications. Further patterns or sequences of changes in location and motion of the user (customers) can be correlated with the electronic communications. The correlation indicates an action by the recipient of the electronic communications based on reception of the electronic communication. Further, for an embodiment, combinations of sensed electronic actions (such as, accessing websites, performing an electronic purchase, etc.) and sensed motion/location actions can be monitored. Each of these sense actions or combinations of actions can be used to indicate a sensed action by the user (customers) based on having received the electronic communication.

Figure 4:
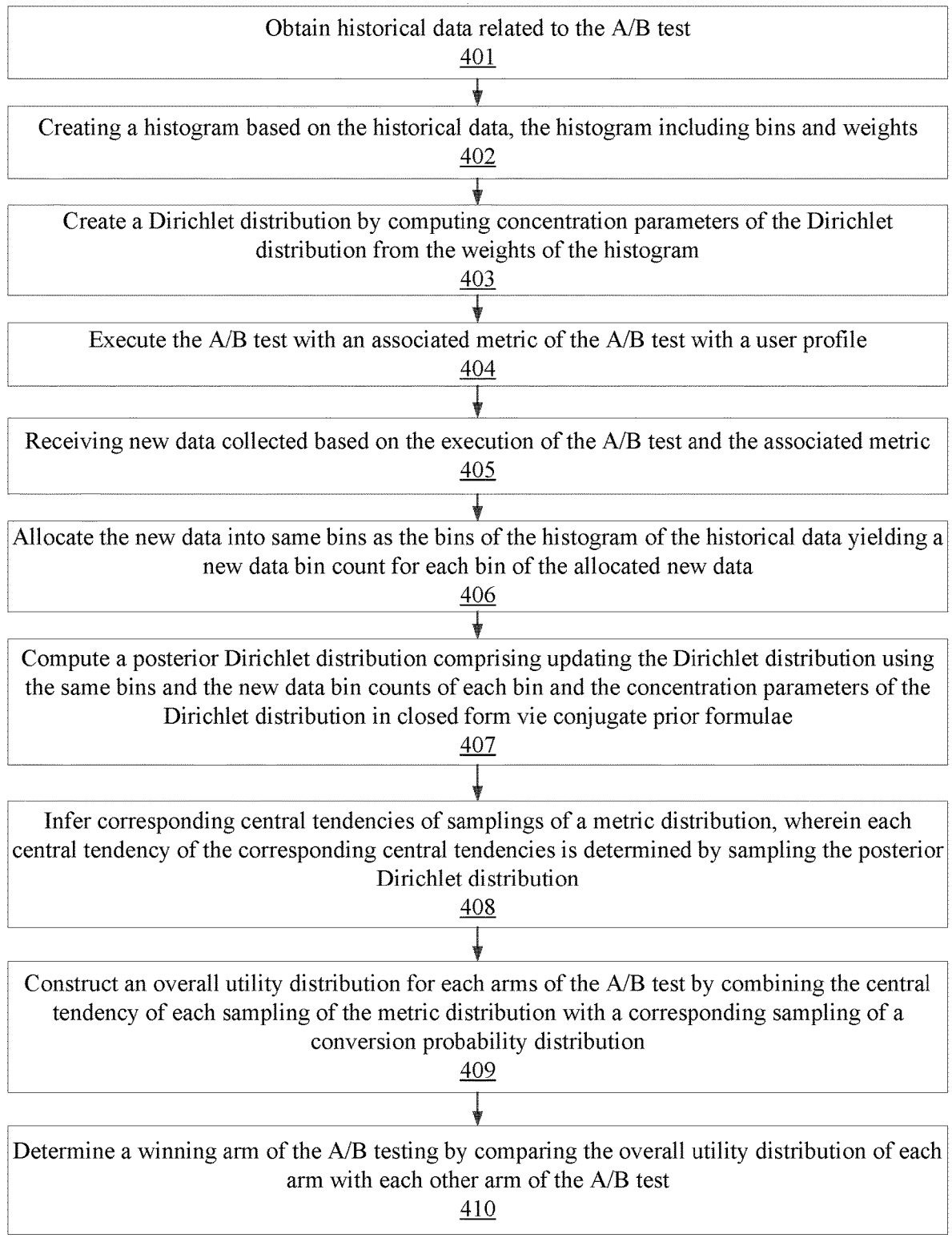
FIG. 4 is a flow chart that includes steps of a method for selecting a winner of an A/B test, according to another embodiment.

FIG. 4 is a flow chart that includes steps of a method for selecting a winner of an A/B test, according to an embodiment. A first step 401 includes obtaining historical data related to the A/B test. A second step 402 includes creating a histogram based on the historical data, the histogram including bins and weights. A third step 403 includes creating a Dirichlet distribution by computing concentration parameters of the Dirichlet distribution from the weights of the histogram. A fourth step 404 includes executing the A/B test with an associated metric of the A/B test with a user profile. For an embodiment, the user profile includes electronic message recipients. A fifth step 405 includes receiving new data (customer actions) collected based on the execution of the A/B test and the associated metric. A sixth step 406 includes allocating the new data into the same bins as the bins of the histogram of the historical data yielding a new data bin count for each bin of the allocated new data. A seventh step 407 includes computing a posterior Dirichlet distribution comprising updating the Dirichlet distribution using the same bins and the new data bin counts and the concentration parameters of the Dirichlet distribution in closed form via conjugate prior formulae. An eighth step 408 includes inferring corresponding central tendencies of samplings of a metric distribution, wherein each central tendency of the corresponding central tendencies is determined by sampling the posterior Dirichlet distribution. A ninth step 409 includes constructing an overall utility distribution for each arm of the A/B test by combining the central tendency of each sampling of the metric distribution with a corresponding sampling of a conversion probability distribution. A tenth step 410 includes determining a winning arm of the A/B testing by comparing the overall utility distribution of each arm with each other arm of the A/B test.

Concentration Parameters

As previously described, for an embodiment, the concentration parameters are computed by multiplying the histogram weights by a scaling factor. For an embodiment, the scaling factor is a number that is selected to ensure that a desired level of uncertainty is achieved by the distribution. For an embodiment, there is a one-to-one relationship between the concentration parameters of the Dirichlet distribution and the histogram weights, so the distribution is entirely specified by the scaled weights. For an embodiment, the parameters of a distribution family are the numbers that define a specific distribution. For example, a normal distribution has two parameters: the mean and standard deviation. In the case of the Dirichlet distribution, there are B numbers of parameters, wherein for the described embodiments, B is the number of bins.

As previously described, for an embodiment, the bins of the allocated new data are the same as the bins of the historical data histogram.

For an embodiment, the inferred corresponding tendencies include an average of the samplings of the metric distribution. For an embodiment, the metric distribution includes a distribution of purchase values. For an embodiment, the central tendency of the samplings of the metric distribution is the average purchase value among those that make a purchase. For an embodiment, each time the Dirichlet distribution is sampled, a set of bar heights for the histogram are generated-recalling that a bar height represents the frequency of getting the bin of the bar, wherein the frequency is synonymous with a probability or a likelihood.

As previously stated, though for at least some embodiments the creation of a Dirichlet distribution from the weights of the histogram, it is to be understood that at least some embodiments include creation of other types of distributions. With or without using a Dirichlet distribution specifically, the uniqueness of the described embodiments is in the combination of the methods and the application. Specifically, the described embodiments include the creation of a density model and a frequency model (distribution of a (conversion) probability) of the metrics previously tracked through the historical data, and the application being electronic A/B testing.

For an embodiment, inferring the central tendency of the posterior metric distribution of the posterior Dirichlet distribution includes sampling the posterior Dirichlet distribution to create values for each bin, and computing a sample mean for each bin comprising summing a center point of endpoints of each bin multiplied by a corresponding created value of the bin.

For an embodiment, the sampling of the posterior Dirichlet distribution to create values for each bin provides a prediction of how frequently the bin occurs in an actual distribution of the new data.

For an embodiment, inferring the central tendency of the posterior metric distribution of the posterior Dirichlet distribution includes sampling the posterior Dirichlet distribution to create values for each bin, and computing a sample mean for each bin comprising summing a center point of endpoints of each bin multiplied by a corresponding created value of the bin, wherein the sampling of the posterior Dirichlet distribution to create values for each bin provides a prediction of how frequently the bin would occur in an actual distribution of the new data.

In some situations, it is possible for the embodiment of FIG. 4 to lose information in historical data by computing a histogram. Depending on how the bin widths are chosen, this could have severe consequences. For example, when there is a single very large outlier and bins are chosen such that all other data are binned into bin. The embodiment of FIG. 3 modifies this by using one bin for each unique value. By doing so, no information is lost, yet the procedure is still fast and effective. However, the embodiment of FIG. 3 may require storing more information and may be in practice somewhat relatively slower. At least some embodiments include interpolations between the embodiments of FIG. 3 and FIG. 4. That is, at least some embodiments include binning data where many points are near in value (to reduce the amount of data stored) and not binning or using small bins where points are far apart to avoid losing information).

Figure 5:
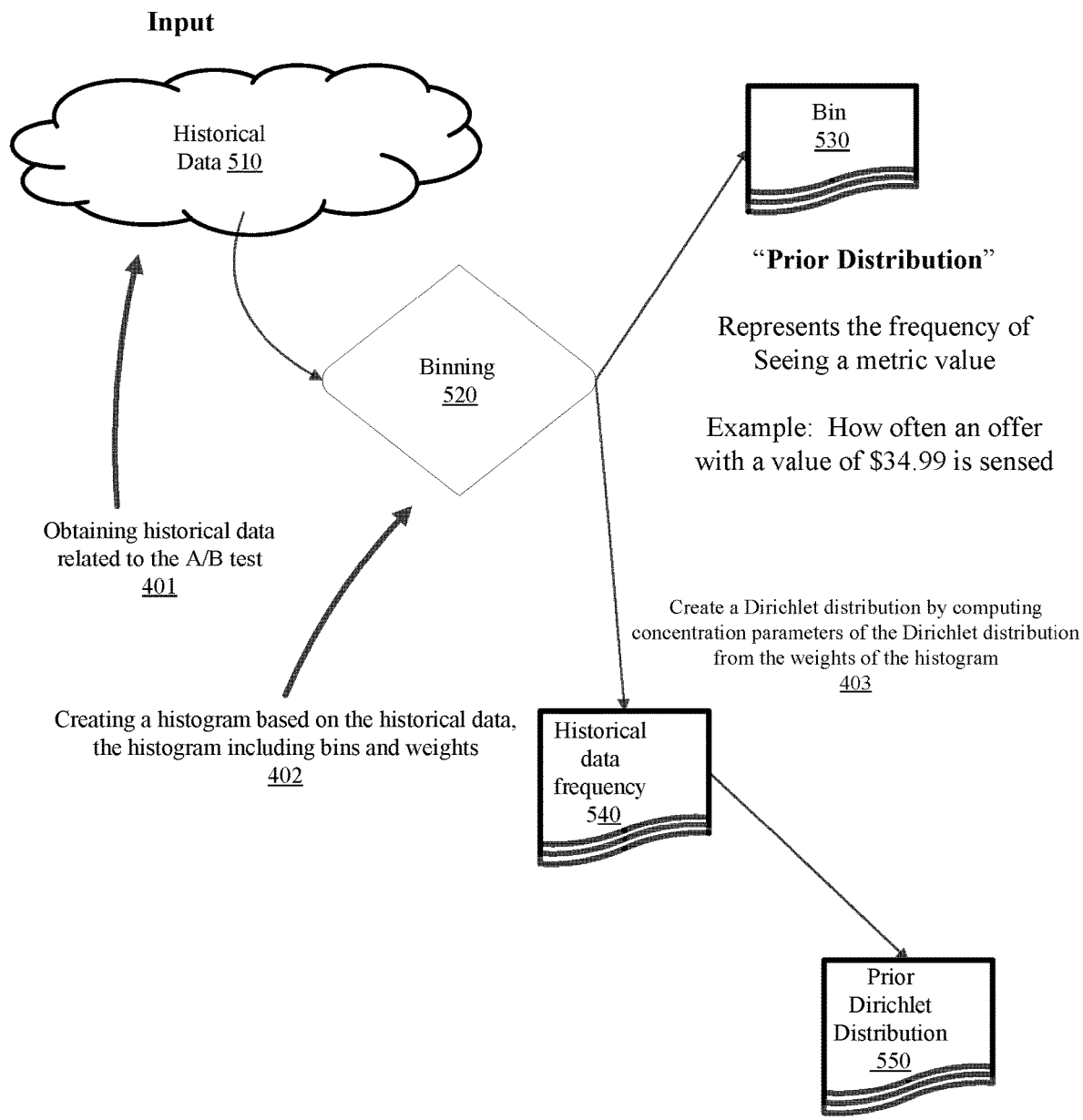
FIG. 5 shows the creation of a Dirichlet distribution based on a histogram that was generated using historical data, according to an embodiment.

FIG. 5 shows the creation of a Dirichlet distribution based on a histogram that was generated using historical data, according to an embodiment. Historical data 510 related to A/B testing is stored and retrieved from prior interactions with users (customers). The data includes any historical data related to the data to be collected and received during the A/B testing.

For an embodiment, Binning 520 includes the creation of a histogram based on the historical data, the histogram including bins and weights of step 402.

A prior distribution that represents a frequency of seeing a metric value (such as, how often an offer with a value of $34.99 is sensed) is created from the binning 520. For an embodiment, the prior distribution which may be a Dirichlet distribution from the weights of the histogram includes a bin (start, end) 530 and historical data frequency 540. For an embodiment, the historical data frequency 540 is used to create the concentration parameters of the Dirichlet distribution. For an embodiment, the bins are transformed into concentration parameters. As previously described, for an embodiment, the concentration parameters are computed by multiplying the histogram weights by a scaling factor. For an embodiment, the scaling factor is a number that is selected to ensure that a desired level of uncertainty is achieved by the distribution. For an embodiment, there is a one-to-one relationship between the concentration parameters of the Dirichlet distribution and the histogram weights, so the distribution is entirely specified by the scaled weights. As previously described, the prior Dirichlet distribution 550 is computed by updating the Dirichlet distribution using the same bins and the new data bin counts and the concentration parameters of the Dirichlet distribution in closed form via conjugate prior formulae.

Figure 6:
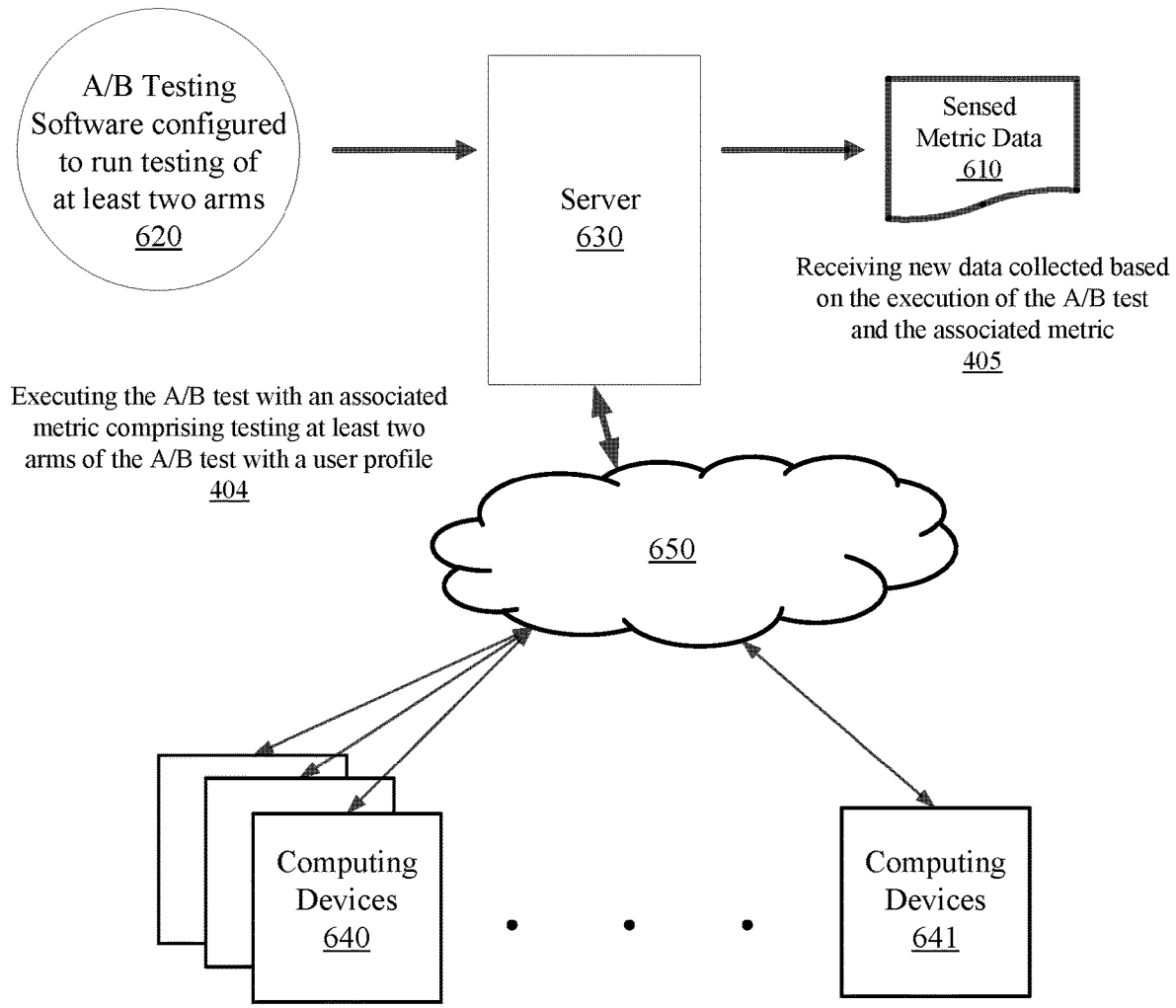
FIG. 6 shows collecting of new data based on A/B testing with an associated metric for at least two arms of the A/B test, according to an embodiment.

FIG. 6 shows collecting of new data based on A/B testing with an associated metric for at least two arms of the A/B test, according to an embodiment. For an embodiment, A/B testing software 620 configured to run testing of at least two arms operates on a server 630 to generate sensed metric data 610. The sensed metric data 610 is collected from A/B testing of user actions of computing devices 640-641 that are network 650 connected to the server 630. As previously described, the sensed customer actions can include any action performed by the customer (recipient) due to the customer (recipient) having received the electronic communication of the A/B test. The sensed customer actions can include sensing physical actions of the customer, such as, actions sensed by electronic sensor(s) located on a computing device of the customer (recipient). Such sensors (global positioning systems, accelerometers, gyroscopes, accelerometers, etc.) can sense physical motion of the customer (recipient) resulting from the customer (recipient) having received the electronic communication. The sensed physical motion can be used to detect a customer visiting a physical location of a merchant and actions of the customer within the physical location of the merchant, such as, physically touching, holding, or moving a product of the merchant at the location of the merchant. For at least some embodiments, the sensed customer actions are digital actions, such as, navigating to a website, spending time or money on an application. For at least some embodiments, the sensed customer actions include a combination of both physical motions/actions by the electronic message recipient (customer) and digital actions by the electronic message recipient (customer).

Figure 7:
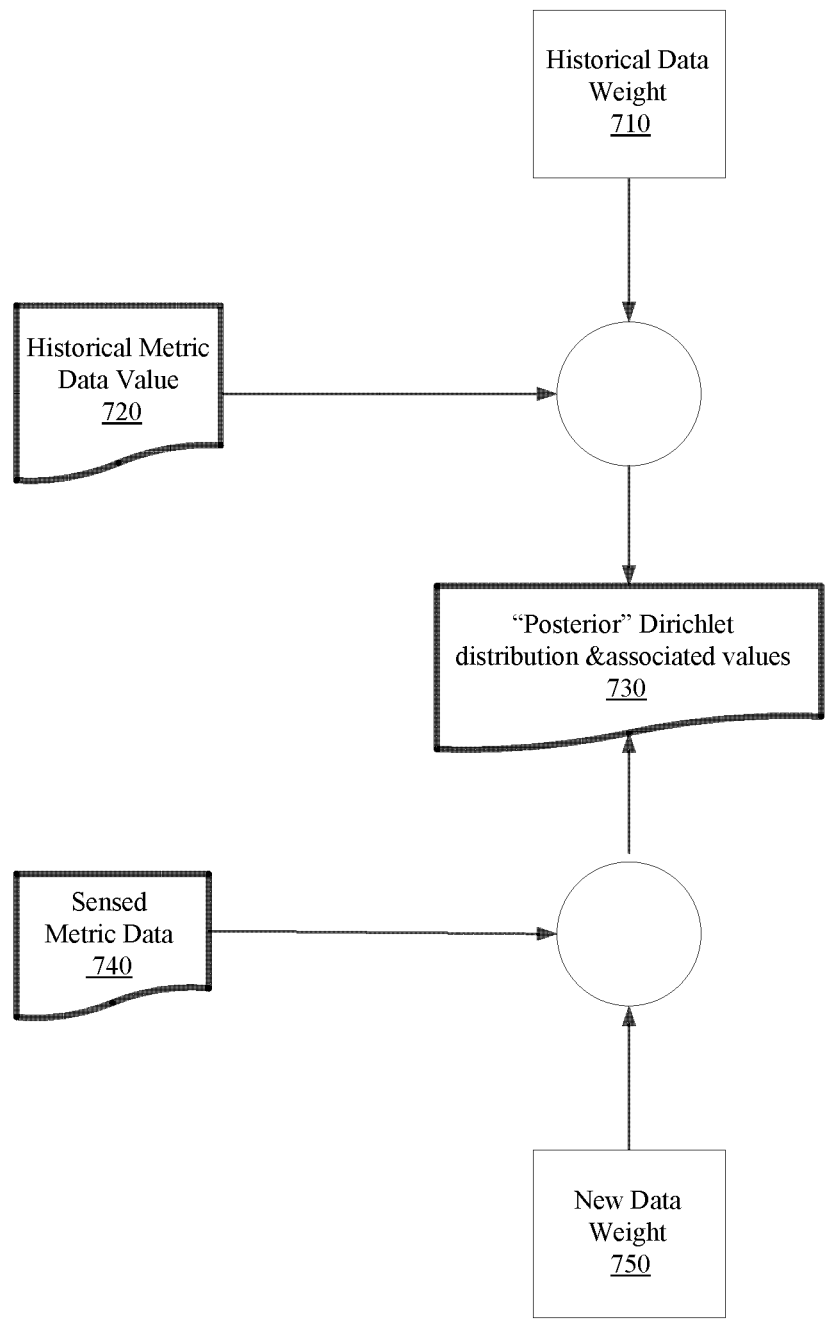
FIG. 7 shows computation of a "posterior" Dirichlet distribution and associated values based on a Dirichlet distribution, historical data values, a historical data weight, collected new data, and a new data weight, according to an embodiment.

FIG. 7 shows computation of a "posterior" Dirichlet distribution and associated values 730 based on a Dirichlet distribution, historical data values 720, historical data weight 710, a collected new data (sensed metric data 740), and a new data weight 750 according to an embodiment. Per the flow chart of FIG. 3, the sensed metric data 740 and the historical data values 720 are combined to create the associated values. Per the flow chart of FIG. 3, the "posterior" Dirichlet distribution is created so that its concentration parameters associated with the new data are equal to the new data weight and the concentration parameters associated with the historical data values are equal to the historical data weight.

Figure 8:
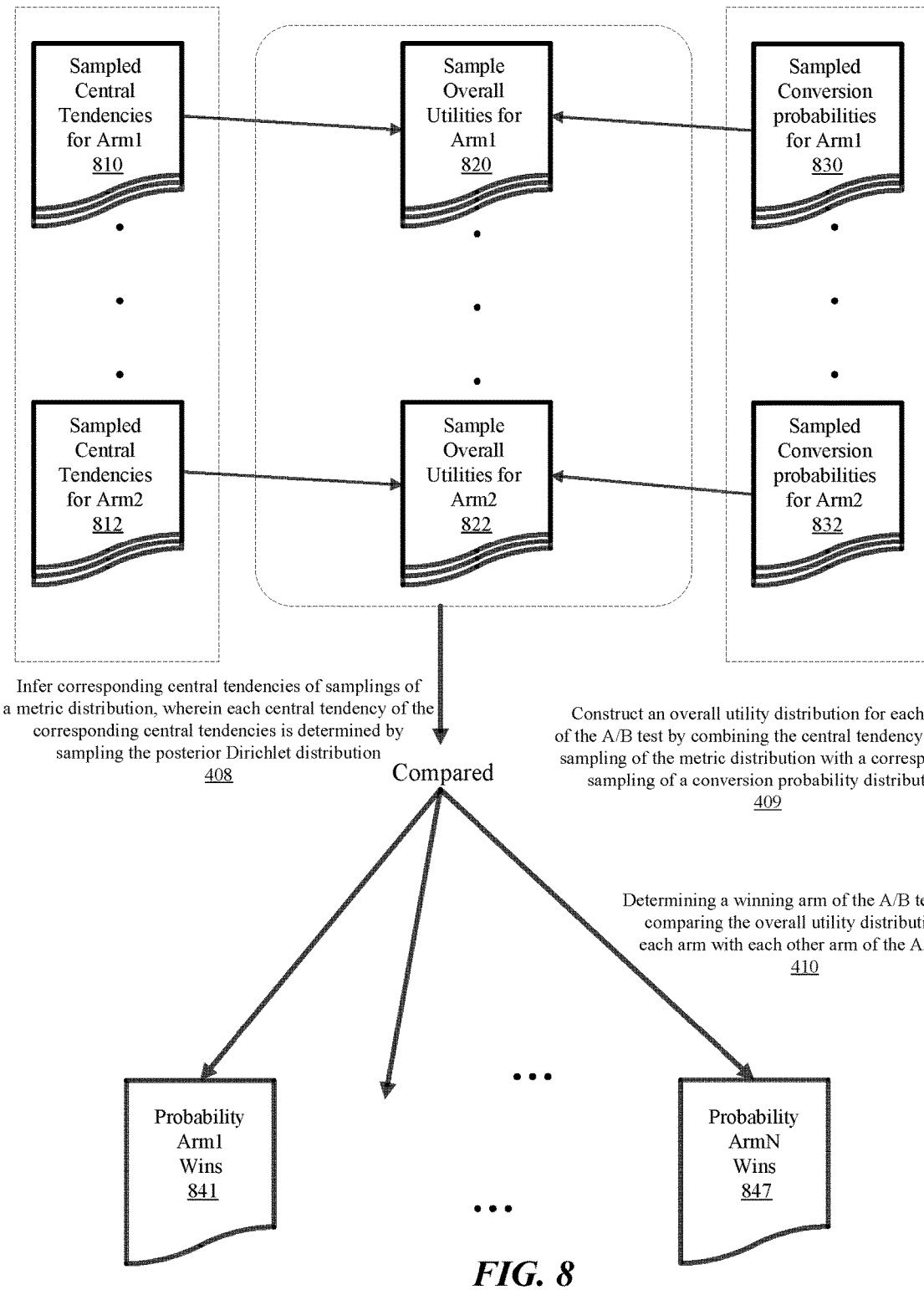
FIG. 8 shows determination of a winning arm of the A/B testing by comparing the overall utility distribution of each arm with each other arm of the A/B test, according to an embodiment.

FIG. 8 shows determination of a winning arm of the A/B testing by comparing the overall utility distribution of each arm with each other arm of the A/B test, according to an embodiment. Sampled central tendencies 810, 812 for different arms (such as, arm1 and arm2), and sampled conversion probabilities 830, 832 for the different arms (such as, arm1 and arm2) are used to generate sample overall utilities 820, 822 of the different arms. For an embodiment, the sample overall utilities 820, 822 represent the previously described overall utility distribution. The "distribution" may be described as "samples" rather than "distribution" because the distribution itself may not be known, but rather samples from the distribution may be known. The terms "distribution" and "samples" may be used interchangeably because with enough samples, the distribution can be estimated.

Comparison of each of the sample overall utilities 820, 822 of the different arms generates the probability 841, 847 that each of the arms is the winning arm. For an embodiment, for each set of samples comprising one overall utility sample for each arm, the arm having the highest sample overall utility can be said to be the "winner". It is to be understood, that for another embodiment, the lowest sample overall utility is 'better' as in the ecigarette example previously described. For an embodiment, when this is done many times (for each set of samples), the fraction of the times that Arm1 was the "winner" is an estimate of the probability that Arm1 wins. It is to be understood that the previously used term "overall utility distribution" may be used interchangeably with the term "overall utility samples".

As previously described, for an embodiment, the overall utility distribution of each arm is compared with each other arm. However, as described, for an embodiment, the samples of overall utility are used to answer a desired question. For example, the desired question may be whether the probability that Arm1 is better than Arm 2 and so on. Another possible desired question is whether the probability that Arm1 is better than Arm 2 by some significant amount. For example, what is the probability that a new message generates 5% higher revenue than an old message.

Figure 9:
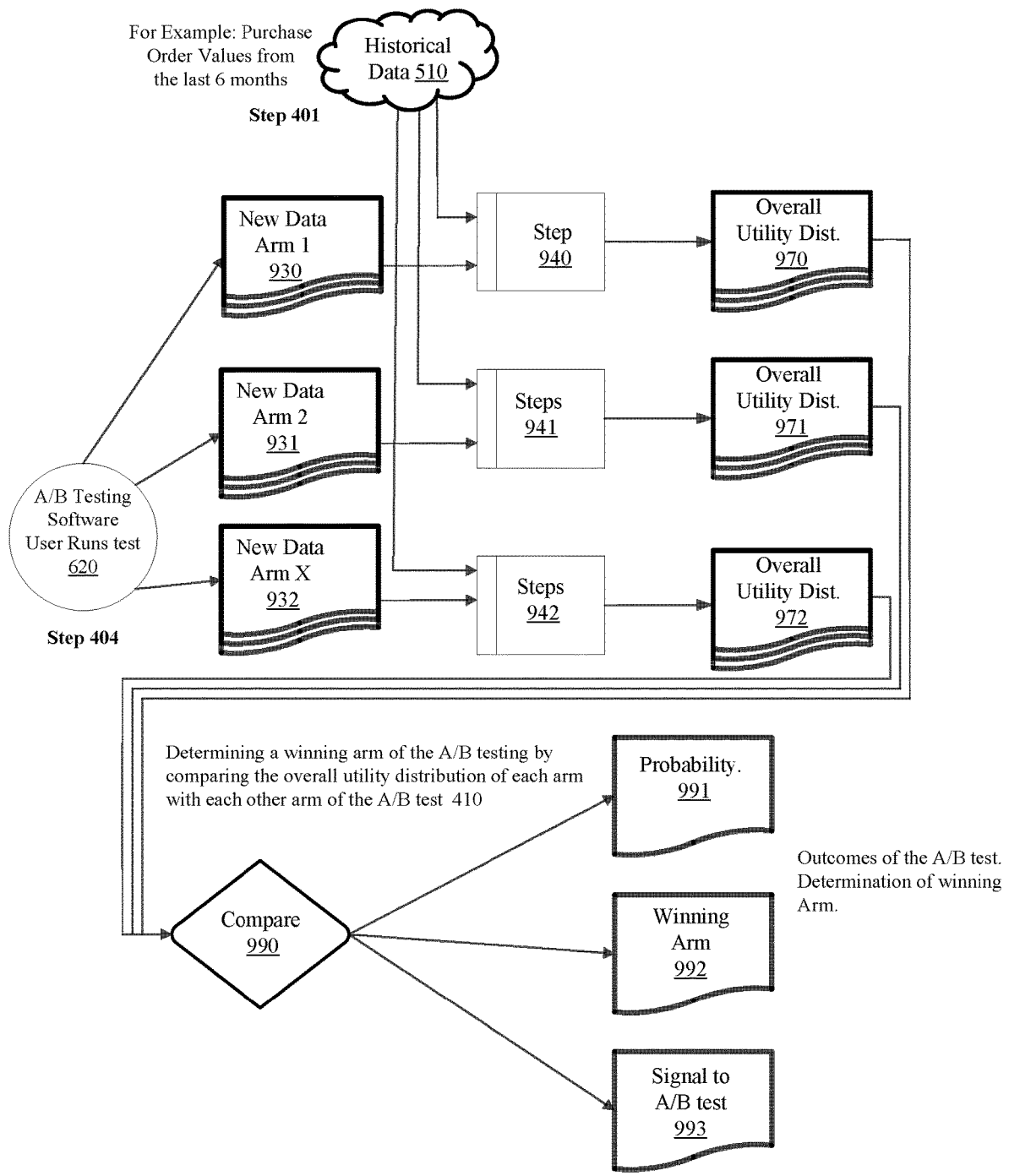
FIG. 9 is a flow chart that includes steps of a method for determining winning arms of electronic testing, according to an embodiment.

FIG. 9 is a flow chart that includes steps of a method for determining winning arms of electronic testing, according to an embodiment. As previously described, for an embodiment, A/B testing software configured to run testing of at least two arms operates on to generate sensed metric data as new data of Arm 1 930, Arm 2 931, Arm X 932. As previously described, historical data 510 related to A/B testing is stored and retrieved from prior interactions with users (customers). The data includes any historical data related to the data to be collected and received during the A/B testing.

For an embodiment, the steps 940, 941, 942 can include the step 301-309, the steps 401-409, or the steps 1201-1010 for each of the arms Arm1, Arm2, . . . , ArmX. For an embodiment, overall utility distributions 970, 971, 972 represent the outputs of step 409 for each of the arms Arm1, Arm2, . . . , ArmX.

Compare 990 includes comparing the overall utility distributions 970, 971, 972 to determine a probability 991, a Winning Arm 992, and a Signal to A/B test 993. For at least some embodiments, the overall utility distributions 970, 971, 972 can be compared 990 in different ways to identify things or information. An embodiment includes deciding which arm the user (merchant) should use going forward (that is, for example, the template the merchant should use for future electronic communications). For an embodiment, this includes determining which arm is the likeliest to have the highest utility (this can be referred to as the 'winning arm'). For an embodiment, this includes reference to a concrete outcome (that is, "Arm A looks the best right now, so use Arm A going forward. An embodiment includes referring to the probability of winning that includes a theoretical, unknown outcome that is attempted to be guessed correctly. Accordingly, an embodiment includes comparing the samples and computing the empirical probability 991 of each arm having higher sampled overall utility than the other arms.

At least some embodiments include knowing not just what the best arm is, but whether any arm is better than the others by some fixed amount. It is to be understood that for this embodiment, there may not be a "winner" if none of the arms are better than the other arms by that fixed amount. Accordingly, the "best" arm may not be the "winner". For an embodiment, arms that differ by less than this fixed amount are said to be within the "region of practical equivalence" (ROPE) in Bayesian statistics literature. Note that this outcome is not explicitly represented currently in FIG. 9. For an embodiment, the "fixed amount" is a number that represents a practical significance that the experimenter can choose. For an embodiment, the fixed amount is adaptive based on historical data or business outcomes the experimenter is trying to drive. As described, the winning arm 992 may be the best arm or the winning arm may be the arm that is the fixed amount better than the other arms.

An embodiment includes automation of the A/B test process using the comparing 990 of the overall utility distributions 970, 971, 972. An embodiment includes deriving from the overall utility distributions a measure of confidence an arm is truly the best arm. For an embodiment, this confidence is then used to send a signal 993 to an outer monitoring process (whose responsibility is managing the experiment at a high level) to adjust the parameters of the A/B testing. One common such signal is simply a signal to stop (or continue) the A/B testing. Another common signal indicates that the distribution of test recipient changes. This process can be referred to as Thompson sampling.

As previously described, in some situations, it is possible for the embodiment of FIG. 4 to lose information in historical data by computing a histogram. Depending on how the bin widths are chosen, this could have severe consequences. For example, when there is a single very large outlier and bins are chosen such that all other data are binned into bin. The embodiment of FIG. 3 modifies this by using one bin for each unique value. By doing so, no information is lost, yet the procedure is still fast and effective. However, the embodiment of FIG. 3 may require storing more information and may be in practice somewhat relatively slower. At least some embodiments include interpolations between the embodiments of FIG. 3 and FIG. 4. That is, at least some embodiments include binning data where many points are near in value (to reduce the amount of data stored) and not binning or using small bins where points are far apart to avoid losing information).

Figure 10A:
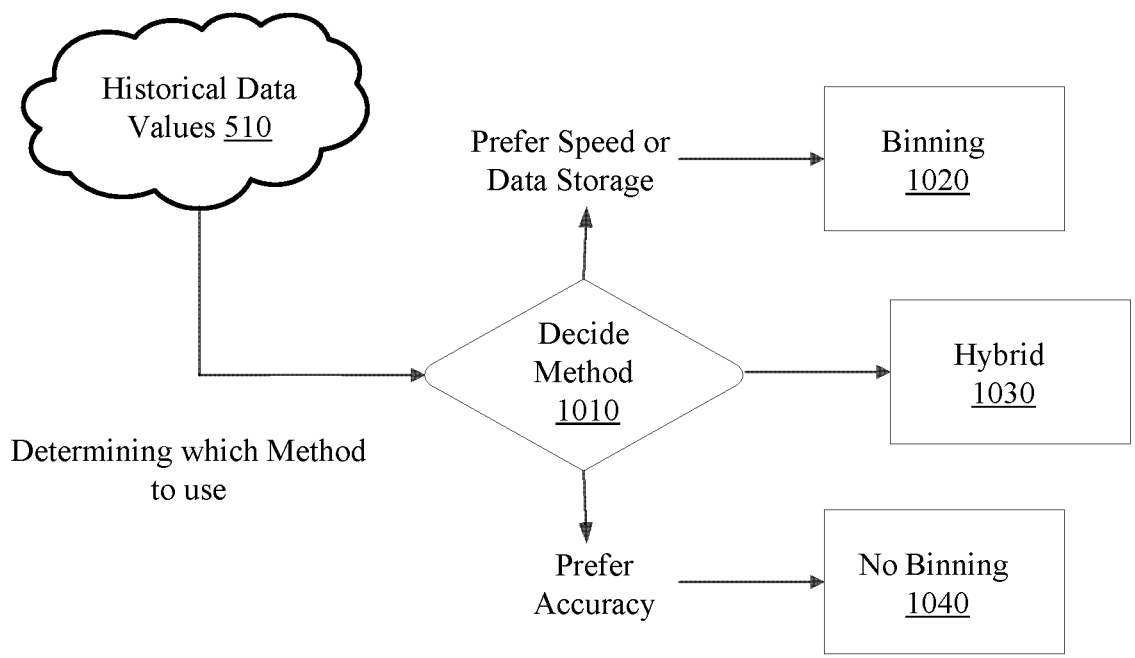
FIG. 10A is a flow chart that includes steps of a method of determining whether to generate a Dirichlet distribution based on the binning of FIG. 4, or the non-binning of FIG. 3, or a partial-binning (hybrid) approach as detailed in FIGS. 10B-11B, according to an embodiment.

FIG. 10A is a flow chart that includes steps of a method of determining whether to generate a Dirichlet distribution based on the binning of FIG. 4, or the non-binning of FIG. 3, or a partial-binning (hybrid) approach detailed in FIGS. 10B-11B, according to an embodiment. As shown, historical values 510 are either binned as shown by the flow chart of FIG. 4, or the historical values are not binned as shown by the flow chart of FIG. 3, or the historical values are partially binned as shown by FIGS. 10B-11B. A decision 1010 between binning or not binning can be based on a preferred speed, data storage, or preferred accuracy. If speed and minimal data storage are preferred, then the binning 1020 of FIG. 4 may be selected. If accuracy is preferred, then no binning 1040 may be selected, and the process of FIG. 3 utilized. However, the combination (hybrid) 1030 of binning and not binning may be selected as a compromise between speed, data storage, and accuracy. For an embodiment, the method for deciding 1010 includes comparing the average distance between binned values and bin centers. If the average distance is more than a threshold, the binning method 1020 is used. Otherwise, if the average distance is more than a smaller threshold, the hybrid method 1030 is used. Otherwise, the non-binning method 1040 is used.

Figure 10B:
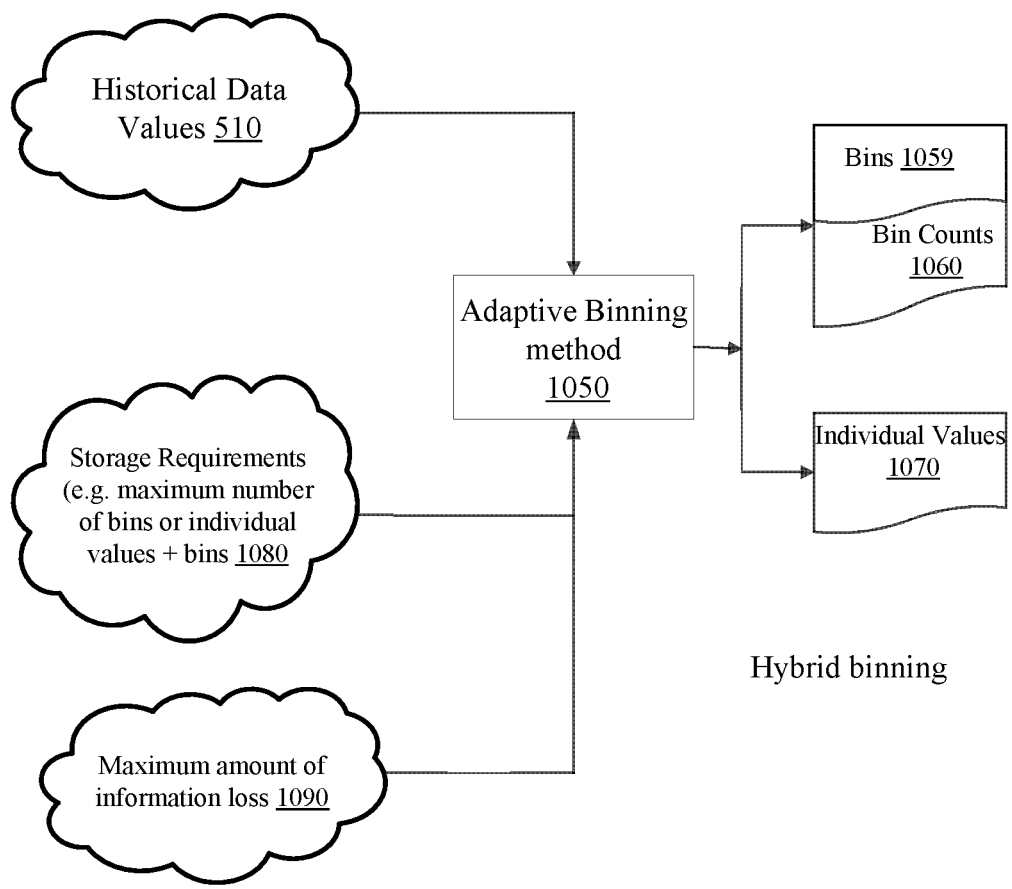
FIG. 10B is a flow chart that includes steps of a method of adaptively binning, according to an embodiment.

FIG. 10B is a flow chart that includes steps of a method of adaptively binning, according to an embodiment. The binning method 1050 attempts to bin the historical data values 510 while satisfying the requirements 1080 and 1090. The adaptive binning 1050 includes computing a set of potentially unequally sized bins 1059 based on how many data values are clustered together (how many points are within a small (selected) radius of each other). Once bins 1059 have been generated, bin counts 1060 and unbinned values 1070 are determined straightforwardly from the historical data values 510. In other words, a data value that falls into a bin is counted towards that bin count; a data value that doesn't fall into any bin is stored as an unbinned individual value. According to another embodiment, the adaptive binning method 1050 includes a clustering process, such as, DBSCAN (density-based spatial clustering of applications with noise).

Figure 11A:
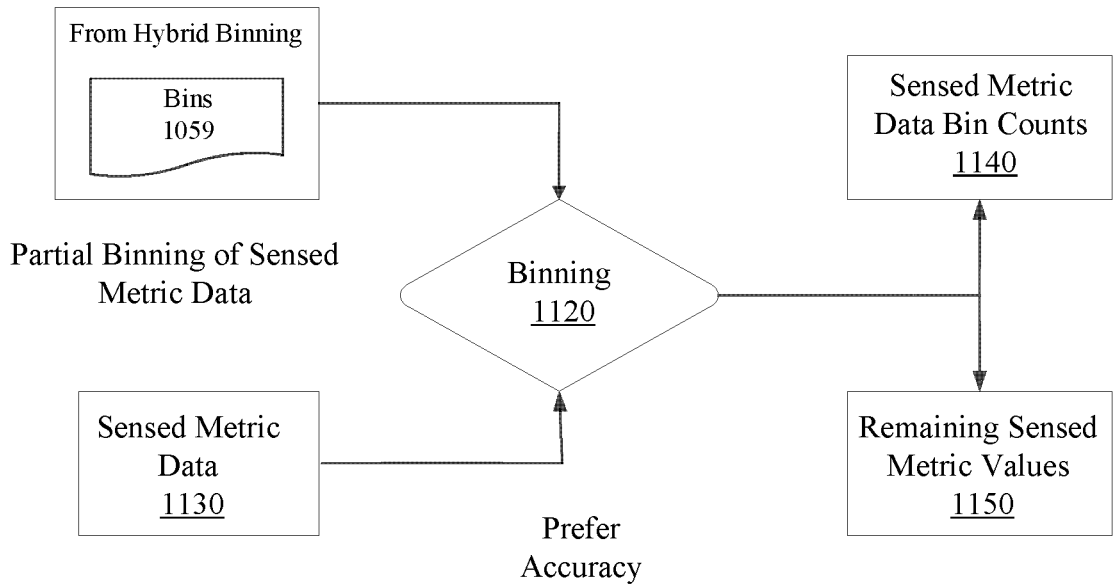
FIG. 11A is a flow chart that includes steps of a method of binning new sensed metric data into the bins of FIG. 10B, according to an embodiment.

FIG. 11A is a flow chart that includes steps of a method of binning 1120 new sensed metric data 1130 into the bins 1059 from FIG. 10B. New sensed metric data values 1030 that fall into one of the bins 1059 are counted towards that bin's count 1140. New sensed metric data values 1130 that are not successfully binned are stored as individual values 1150 so that they may be passed to the next process.

Figure 11B:
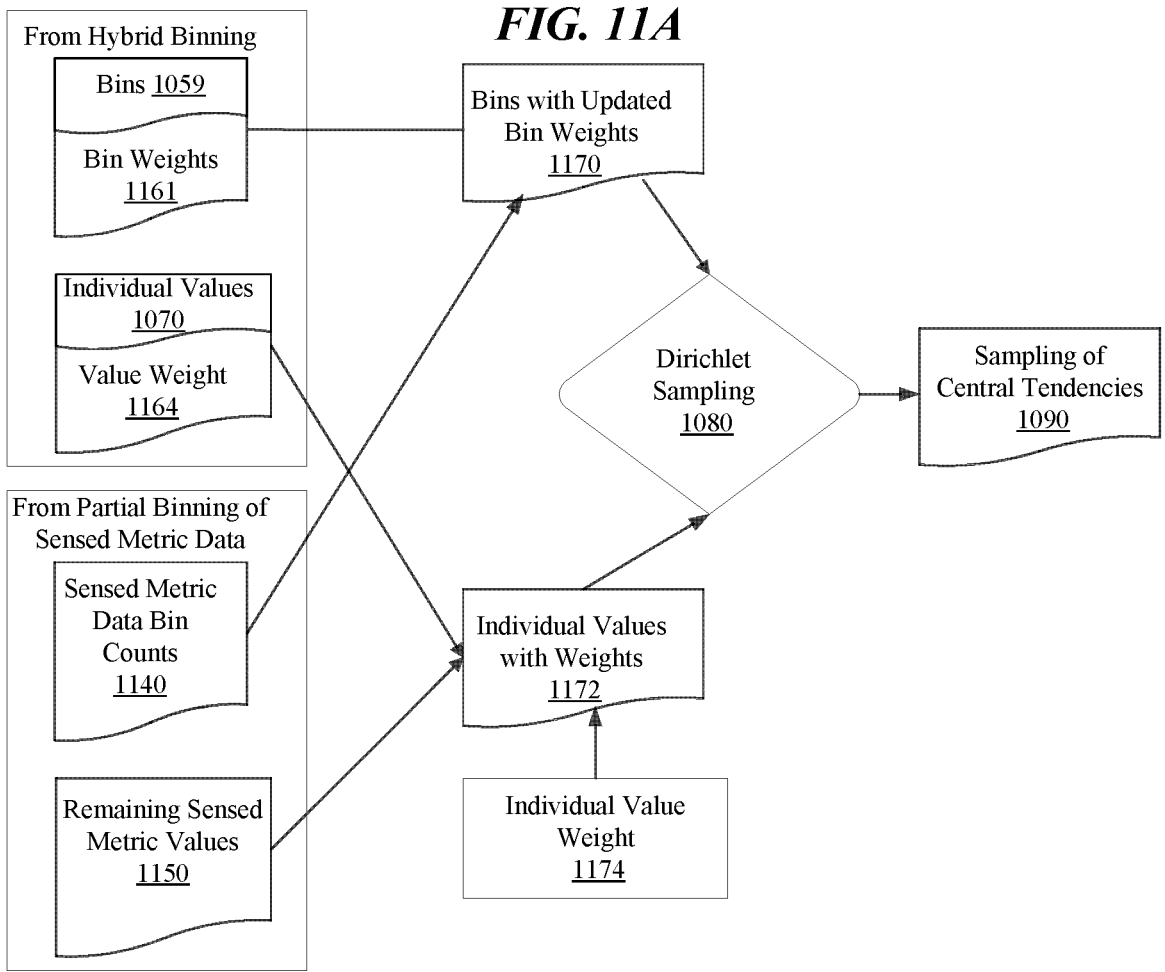
FIG. 11B is a flow chart that includes steps of a method of combining binned and unbinned values from historical data and new sensed data, according to an embodiment.

FIG. 11B is a flow chart that includes steps of a method of combining binned and unbinned values from historical data and new sensed data. Sensed data bin counts 1140 are added to the historic data bin weights 1161, resulting in updated bin weights 1170. These weights are associated with the bins 1159. The remaining sensed metric values 1150 and a weight 1174 for new sensed individual values are combined with the historical metric values 1070 and their weight 1164, resulting in a set of individual values and associated weights 1172. The bins and individual values are sampled 1080 via a Dirichlet distribution, whose concentration parameters equal to the updated bin weights 1170 and individual value weights 1172. The Dirichlet distribution samples are transformed into a sampling of a historical (central) tendencies 1090 as described in Steps 307 and 408 of FIG. 3 and FIG. 4.

Figure 12:
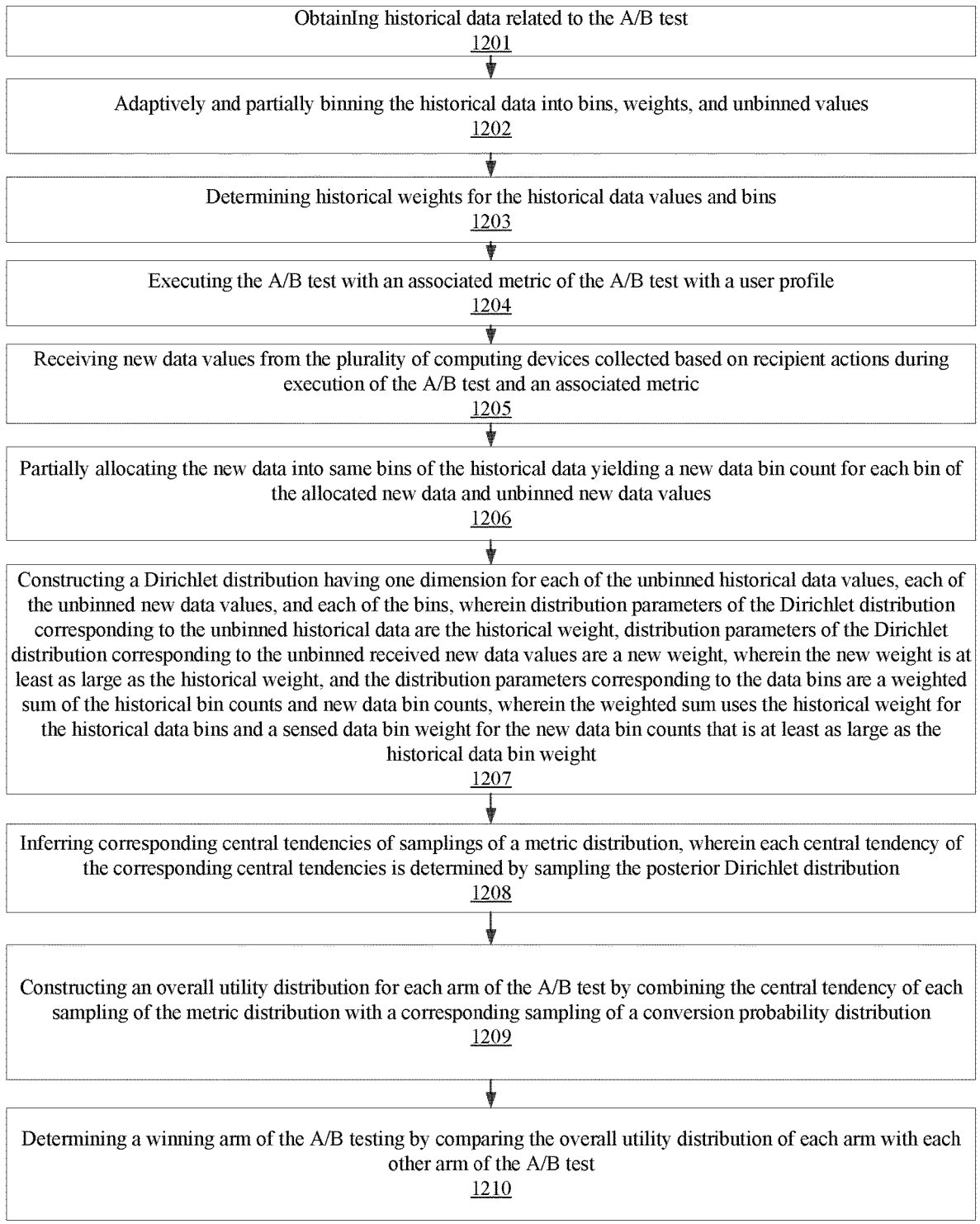
FIG. 12 is a flow chart that includes steps of a method of selecting a winner of an A/B test, according to another embodiment.

FIG. 12 is a flow chart that includes steps of a method of selecting a winner of an A/B test, according to another embodiment. A first step 1201 includes obtaining historical data related to the A/B test (similar to step 301). A second step 1202 includes adaptively and partially binning the historical data into bins, weights, and unbinned values (similar to step 402). For an embodiment, the adaptive and partial binning is based on desired speed, data storage, and/or accuracy. A third step 1203 includes determining historical weights for the historical data values and bins (similar to step 303). A fourth step 1203 includes executing the A/B test with an associated metric of the A/B test with a user profile (similar to step 304). A fifth step 1205 includes receiving new data values from a plurality of computing devices collected based on recipient actions during execution of the A/B test and an associated metric (similar to step 305). A sixth step 1206 includes partially allocating the new data into the same bins of the historical data yielding a new data bin count for each bin of the allocated new data and unbinned new data values (similar to step 406]). For an embodiment, the partial allocation is based on computed bins of step 1202.

A seventh step 1207 includes constructing a Dirichlet distribution having one dimension for each of the unbinned historical data values, each of the unbinned new data values, and each of the bins, wherein:
  a. distribution parameters of the Dirichlet distribution corresponding to the unbinned historical data are the historical weight,
  b. distribution parameters of the Dirichlet distribution corresponding to the unbinned received new data values are a new weight, wherein the new weight is at least as large as the historical weight, and
  c. the distribution parameters corresponding to the data bins are a weighted sum of the historical bin counts and new data bin counts, wherein the weighted sum uses the historical weight for the historical data bins and a sensed data bin weight for the new data bin counts that is at least as large as the historical data bin weight (similar to step 306 and step 407).

For an embodiment, the sensed data bin weight is equal to one. An eighth step 1208 includes inferring corresponding central tendencies of samplings of a metric distribution, wherein each central tendency of the corresponding central tendencies is determined by sampling the posterior Dirichlet distribution (similar to step 408). A ninth step 1209 includes constructing an overall utility distribution for each arm of the A/B test by combining the central tendency of each sampling of the metric distribution with a corresponding sampling of a conversion probability distribution (similar to step 409). A tenth step 1210 includes determining a winning arm of the A/B testing by comparing the overall utility distribution of each arm with each other arm of the A/B test (similar to step 410).

As previously described, an embodiment includes electronically communicating with recipients of computing devices using a template based on the winning arm of the A/B testing.

Although specific embodiments have been described and illustrated, the embodiments are not to be limited to the specific forms or arrangements of parts so described and illustrated. The described embodiments are to only be limited by the claims.

What is claimed:

1. A system configured to select a winner of an A/B test, comprising:
  a plurality of computing devices;
  a user server;
  a management server, the management server connected to the user server and the plurality of computing devices through a network, the server configured to:
  obtain historical data values related to the A/B test of a user of the user server;
  store the historical data values;
  determine a historical weight for the historical data values;
  receive new data values from the plurality of computing devices collected based on recipient actions during execution of the A/B test and an associated metric;
  construct a Dirichlet distribution having one dimension for each of the historical data values and each of the received new data values, wherein distribution parameters of the Dirichlet distribution corresponding to the historical data values are the historical weight, and distribution parameters of the Dirichlet distribution corresponding to the received new data values are a new weight, wherein the new weight is at least as large as the historical weight;

infer corresponding central tendencies of samplings of a metric distribution, wherein each central tendency of the corresponding central tendencies is determined by sampling the Dirichlet distribution;

construct an overall utility distribution for each arms of the A/B test by combining the central tendency of each sampling of the metric distribution with a corresponding sampling of a conversion probability distribution;

determine a winning arm of the A/B testing by comparing the overall utility distribution of each arm with each other arm of the A/B test; and electronically communicate with recipients of the computing devices using a template based on the winning arm of the A/B testing;

wherein obtaining historical data related to the A/B test includes sensing of past actions of recipients related to the A/B test, wherein receiving new data collected based on the execution of the A/B test and the associated metric comprises sensing actions of recipients electronically receiving electronic communications of the A/B test, and further comprising influencing future electronic communications with recipients based on the winning arm of the A/B test;

wherein sensing actions of the recipients comprises sensing, by sensors of computing devices of the recipients, changes in physical location and motion of the recipient that are correlated with receiving the electronic communications, and wherein influencing future electronic communications with the recipient comprises selecting a winning template associated with the winning arm of the A/B test, wherein the winning template is used for future electronic communications with the recipients.

2. A method for selecting a winner of an A/B test, comprising:

obtaining historical data values related to the A/B test of a user of the user server;

storing the historical data values;

determining a historical weight for the historical data values;

receiving new data values from the plurality of computing devices collected based on recipient actions during execution of the A/B test and an associated metric;

constructing a Dirichlet distribution having one dimension for each of the historical data values and each of the received new data values, wherein distribution parameters of the Dirichlet distribution corresponding to the historical data values are the historical weight, and distribution parameters of the Dirichlet distribution corresponding to the received new data values are a new weight, wherein the new weight is at least as large as the historical weight;

inferring corresponding central tendencies of samplings of a metric distribution, wherein each central tendency of the corresponding central tendencies is determined by sampling the Dirichlet distribution;

constructing an overall utility distribution for each arms of the A/B test by combining the central tendency of each sampling of the metric distribution with a corresponding sampling of a conversion probability distribution;

determining a winning arm of the A/B testing by comparing the overall utility distribution of each arm with each other arm of the A/B test; and electronically communicating with recipients of the computing devices using a template based on the winning arm of the A/B testing;

wherein obtaining historical data related to the A/B test includes sensing of past actions of recipients related to the A/B test, wherein receiving new data collected based on the execution of the A/B test and the associated metric comprises sensing actions of recipients electronically receiving electronic communications of the A/B test, and further comprising influencing future electronic communications with recipients based on the winning arm of the A/B test;

wherein sensing actions of the recipients comprises sensing, by sensors of computing devices of the recipients, changes in physical location and motion of the recipient that are correlated with receiving the electronic communications, and wherein influencing future electronic communications with the recipient comprises selecting a winning template associated with the winning arm of the A/B test, wherein the winning template is used for future electronic communications with the recipients.

3. The method of claim 2, wherein each central tendency is determined for each sample of sampling of the Dirichlet distribution.

4. The method of claim 2, wherein the winning arm is an arm that most frequently has a highest sampled utility when sampling the overall utility distribution of the arm.

5. The method of claim 2, wherein the A/B test comprises testing of at least one of websites, forms, templates of emails, or templates of mobile messages.

6. The method of claim 2, wherein each arm of the A/B testing includes a template of at least one of a form, an email, or a mobile message, including an A template and a B template, wherein each template includes a set of data objects that combine to represent a structure of the form, the email, or the mobile message, wherein the A template and the B template of the form, the email, or the mobile message each have a different content, behavior, or send time.

7. The method of claim 6, wherein the different behavior includes the form, the email, or the mobile message popping up being loaded or sliding out from a side of a display of a recipient after being loaded.

8. The method of claim 6, further comprising selecting the winning arm as a user default, wherein the selected user default is used for electronic communications with recipients.

9. The method of claim 2, wherein the associated metric includes at least one of revenue per message, a purchase value, a quantity of items purchased, a number of times software users open an application, an amount of time users spends in an application.

10. The method of claim 2, further comprising selecting weighting of distribution of recipients receiving each of the arms based on the overall utility distribution for each of the arms of the A/B test.

11. The method of claim 10, wherein the weighting of distribution of each arm is based on how frequently the arm was a highest sampled utility when sampling the overall utility distribution of the arm.

12. The method of claim 2, further comprising ending the A/B test based on the overall utility distribution for each of the arms of the A/B test.

13. The method of claim 2, wherein the A/B testing is ended when the overall utility distribution of one arm is a threshold better than each of other arms.

14. The method of claim 2, wherein inferring corresponding central tendencies of samplings of a metric distribution comprises:
   sampling the Dirichlet distribution to create values for each data value; and
   computing a sample mean for each data value comprising summing a data value multiplied by a corresponding created value of the data value.

15. The method of claim 2, wherein receiving the new data collected based on the execution of the A/B test and the associated metric comprises sensing actions of recipients of electronic communications of the A/B test.

16. The method of claim 15, wherein sensing actions of the recipients includes sensing physical motion of the recipients including sensing keyboards actions of the recipients, sensing physical motion of the recipients, and tracking locations of the recipients.

17. The system of claim 1, wherein inferring corresponding central tendencies of samplings of a metric distribution comprises:
   sampling the Dirichlet distribution to create values for each data value; and
   computing a sample mean for each data value comprising summing a data value multiplied by a corresponding created value of the data value.

18. The system of claim 1, wherein receiving the new data collected based on the execution of the A/B test and the associated metric comprises sensing actions of recipients of electronic communications of the A/B test.

\* \* \* \* \*